United States Patent
Miller et al.

(10) Patent No.: US 6,324,183 B1
(45) Date of Patent: *Nov. 27, 2001

(54) SYSTEMS AND METHODS FOR COMMUNICATING MESSAGES AMONG SIGNALING SYSTEM 7 (SS7) SIGNALING POINTS (SPS) AND INTERNET PROTOCOL (IP) NODES USING SIGNAL TRANSFER POINTS (STPS)

(75) Inventors: Paul Andrew Miller; David Michael Sprague; Dan Alan Brendes, all of Raleigh; Venkataramaiah Ravishankar, Apex, all of NC (US)

(73) Assignee: Tekelec, Calabasas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,809

(22) Filed: Dec. 4, 1998

(51) Int. Cl.⁷ ....................................................... H04J 3/22
(52) U.S. Cl. .......................... 370/467; 370/469; 370/524
(58) Field of Search ..................................... 370/382, 353, 370/354, 401, 410, 460, 467, 469, 522, 524, 465, 466, 426; 379/115, 205, 220, 228, 230

(56) References Cited

U.S. PATENT DOCUMENTS

| H1880 | 10/2000 | Vines et al. . |
| H1896 | 10/2000 | Hoffpauir et al. . |
| 5,008,929 | 4/1991 | Olsen et al. . |

(List continued on next page.)

FOREIGN PATENT DOCUMENTS

| WO 97/11563 | 3/1997 | (WO) . |
| WO 00/22840 | 4/2000 | (WO) . |
| WO 00/30369 | 5/2000 | (WO) . |
| WO 00/31933 | 6/2000 | (WO) . |
| WO 00/33519 | 6/2000 | (WO) . |

OTHER PUBLICATIONS

O'Shea, "Mating Season," Telephony, p. 10–11, (Sep. 20, 1999).

(List continued on next page.)

Primary Examiner—Hassan Kizou
Assistant Examiner—Saba Tsegaye
(74) Attorney, Agent, or Firm—Jenkins & Wilson, P.A.

(57) ABSTRACT

Seamless transport of messages is provided between SS7 network elements and Internet Protocol (IP) network elements using an STP as an intermediary. Thus, messages may be routed between a first SP and a second SP via an STP using IP. Messages may be routed between an SP and an IP node via an STP using IP. Messages also may be routed between a first IP node and a second IP node via an STP using IP. Thus, the STP can be used as a vehicle for message transport among nodes of an SS7 network, among nodes of an IP network and between SS7 and IP networks. SS7 messages are bidirectionally communicated between an STP and at least one other SP of an SS7 network using IP, preferably TCP/IP. Preferably, SS7 messages are bidirectionally communicated between an STP and at least one SCP using IP. In particular, a first SS7 message that is received from the STP includes an SS7 Message Transfer Part (MTP) layer, an SS7 Signaling Connection Control Part (SCCP) layer and an SS7 Transaction Capability Application Part (TCAP) layer. The MTP layer (SS7 levels 1–3) is stripped from the first SS7 message. An IP routing layer is added to the SSCP layer and the TCAP layer that remain in the first SS7 message, to create a first IP message. The IP routing layer includes an IP address. The first IP message is transmitted to the IP address over an IP network. A second IP message is received from the IP network. The second IP message includes an SS7 SCCP layer, an SS7 TCAP layer and an IP routing layer. The IP routing layer is stripped from the second IP message to create a second SS7 message including an SS7 SCCP layer and an SS7 TCAP layer. The second SS7 message is then transferred to the STP.

32 Claims, 14 Drawing Sheets

U.S. PATENT DOCUMENTS

| | | |
|---|---|---|
| 5,142,622 | 8/1992 | Owens . |
| 5,208,811 | 5/1993 | Kashio et al. . |
| 5,239,542 | 8/1993 | Breidenstein et al. . |
| 5,315,641 | 5/1994 | Montgomery et al. . |
| 5,384,840 | 1/1995 | Blatchford et al. . |
| 5,420,916 | 5/1995 | Sekiguchi . |
| 5,430,727 | 7/1995 | Callon . |
| 5,509,010 | 4/1996 | La Porta et al. . |
| 5,568,487 | 10/1996 | Sitbon et al. . |
| 5,581,558 | 12/1996 | Horney, II et al. . |
| 5,583,927 | 12/1996 | Ely et al. . |
| 5,586,177 | 12/1996 | Farris et al. . |
| 5,638,431 | 6/1997 | Everett et al. . |
| 5,640,446 | 6/1997 | Everett et al. . |
| 5,651,002 | 7/1997 | Van Seters et al. . |
| 5,657,452 | 8/1997 | Kralowetz et al. . |
| 5,664,102 | 9/1997 | Faynberg . |
| 5,675,635 | 10/1997 | Vos et al. . |
| 5,680,552 | 10/1997 | Netravali et al. . |
| 5,696,809 | 12/1997 | Voit . |
| 5,701,301 * | 12/1997 | Weisser, Jr. ............... 370/428 |
| 5,706,286 | 1/1998 | Reiman et al. . |
| 5,712,903 | 1/1998 | Bartholomew et al. . |
| 5,732,213 * | 3/1998 | Gessel et al. ............... 709/224 |
| 5,740,374 | 4/1998 | Raffali-Schreinemachers . |
| 5,761,281 | 6/1998 | Baum et al. . |
| 5,764,750 | 6/1998 | Chau et al. . |
| 5,764,955 | 6/1998 | Doolan . |
| 5,768,361 | 6/1998 | Cowgill . |
| 5,768,525 | 6/1998 | Kralowetz et al. . |
| 5,774,695 * | 6/1998 | Autrey et al. ............... 395/500.47 |
| 5,781,534 | 7/1998 | Perlman et al. . |
| 5,787,255 | 7/1998 | Parlan et al. . |
| 5,793,771 | 8/1998 | Darland et al. . |
| 5,802,285 | 9/1998 | Hirviniemi . |
| 5,805,587 | 9/1998 | Norris et al. . |
| 5,809,028 | 9/1998 | Nethercott et al. . |
| 5,812,669 | 9/1998 | Lee et al. . |
| 5,812,781 | 9/1998 | Fahlman et al. . |
| 5,828,844 | 10/1998 | Civanlar et al. . |
| 5,838,782 | 11/1998 | Lindquist . |
| 5,852,660 | 12/1998 | Lindquist et al. . |
| 5,867,495 | 2/1999 | Elliot et al. . |
| 5,870,565 * | 2/1999 | Glitho ............... 709/249 |
| 5,872,782 | 2/1999 | Dendi . |
| 5,878,129 | 3/1999 | Figurski et al. . |
| 5,889,954 | 3/1999 | Gessel et al. . |
| 5,892,822 | 4/1999 | Gottlieb et al. . |
| 5,912,887 | 6/1999 | Sehgal . |
| 5,917,900 | 6/1999 | Allison et al. . |
| 5,923,659 * | 7/1999 | Curry et al. ............... 370/401 |
| 5,926,482 | 7/1999 | Christie et al. . |
| 5,940,598 | 8/1999 | Strauss et al. . |
| 5,949,871 | 9/1999 | Kabay et al. . |
| 5,958,016 | 9/1999 | Chang et al. . |
| 5,974,052 | 10/1999 | Johnson et al. . |
| 5,995,608 * | 11/1999 | Detampel, Jr. et al. ............... 379/205 |
| 5,999,301 | 11/1999 | Christie . |
| 6,011,780 | 1/2000 | Vaman et al. . |
| 6,011,794 | 1/2000 | Mordowitz et al. . |
| 6,011,803 * | 1/2000 | Bicknell et al. ............... 370/467 |
| 6,014,379 * | 1/2000 | White et al. ............... 370/389 |
| 6,018,515 | 6/2000 | Sorber . |
| 6,021,126 | 2/2000 | White . |
| 6,023,502 | 2/2000 | Bouanaka . |
| 6,026,091 | 2/2000 | Christie et al. . |
| 6,047,005 | 4/2000 | Shermann et al. . |
| 6,064,653 | 5/2000 | Farris . |
| 6,069,890 | 5/2000 | White et al. . |
| 6,075,783 | 6/2000 | Voit . |
| 6,078,582 | 6/2000 | Curry et al. . |
| 6,079,036 | 6/2000 | Moharram . |
| 6,084,892 | 7/2000 | Benash et al. . |
| 6,084,956 | 7/2000 | Turner et al. . |
| 6,094,437 | 7/2000 | Loehndorf, Jr. et al. . |
| 6,097,719 | 8/2000 | Benash et al. . |
| 6,097,805 | 8/2000 | Figurski et al. . |
| 6,111,893 | 8/2000 | Volftsun et al. . |
| 6,115,383 | 9/2000 | Bell et al. . |
| 6,118,779 | 9/2000 | Madonna et al. . |
| 6,118,780 | 9/2000 | Dunn et al. . |
| 6,119,160 | 9/2000 | Zhang et al. . |
| 6,122,255 | 9/2000 | Bartholomew et al. . |
| 6,122,263 | 9/2000 | Dahlin et al. . |
| 6,125,111 | 9/2000 | Snow et al. . |
| 6,125,177 | 9/2000 | Whittaker . |
| 6,128,379 | 10/2000 | Smyk . |
| 6,134,235 | 10/2000 | Goldman et al. . |
| 6,134,246 | 10/2000 | Cai et al. . |
| 6,137,869 | 10/2000 | Voit et al. . |
| 6,137,874 | 10/2000 | Brown et al. . |
| 6,144,667 | 11/2000 | Doshi et al. . |
| 6,144,670 | 11/2000 | Sponaugle et al. . |
| 6,151,930 | 11/2000 | Volftsun et al. . |
| 6,154,467 | 11/2000 | Hager et al. . |
| 6,195,425 | 2/2001 | Farris . |
| 6,201,804 | 3/2001 | Kikinis . |
| 6,215,783 | 4/2001 | Neyman . |
| 6,236,722 | 5/2001 | Gilbert et al. . |

OTHER PUBLICATIONS

O'Shea, "The Network that's Never Done,"Telephony, p. 38–43, (Sep. 15, 1997).

Snyder, "Rerouting Internet Traffic Jams," Telephony, p. 12, (Nov. 11, 1996).

Snyder, "Branded with Optics," Telephony, p. 49–50, (Jul. 22, 1996).

Anonymous, "Around the Loop," Telephony, p. 26, (Jul. 22, 1996).

"Eagle® Feature Guide, " Publication PN/9110–1225–01, Rev. B, Tekelec (Jan., 1998).

"Eagle® STP Platform," Publication 908–0126–01, Rev. A, Tekelec (1997).

"Eagle® STP STP LAN Interface Feature," Publication 908–0134–01, Rev. B, Tekelec (1997).

"Eagle® STP Database Transport Access Feature," Publication 908–0136–01, Rev. B, Tekelec (1997).

"Eagle® STP X.25 to SS7–IS.41 Protocol Conversion Feature," Publication 908–0135–01, Rev. B, Tekelec (1997).

"Eagle® STP ANSI–ITU Gateway Feature," Publication 908–0133–01, Rev. B, Tekelec (1997).

"SS7–Frame Relay Access Device SS7 Protocol Information Translator," Publication 908–0167–01, Rev. A, Tekelec (1997).

ZAHARYCHUK ET AL., "Gateway Signal Transfer Points: Design, Services and Benefits," IEEE, pp. 223.2.1.–223.2.8, (May 29, 1990).

BOOTMAN ET AL., "Generic Building Blocks for the Telecommunications Management Network," IEEE, pp. 6.1.1.–6.1.5, (May 29, 1988).

BOOTMAN, "Intelligent Network Services Using a Service Switching Node,"IEEE, pp. 40.7.1–40.2.4, (May 29, 1988).

BUCKLES, "Very High Capacity Signaling Transfer Point For Intelligent Network Services," IEEE, pp. 40.2.1–40.2.4, (1988).

* cited by examiner

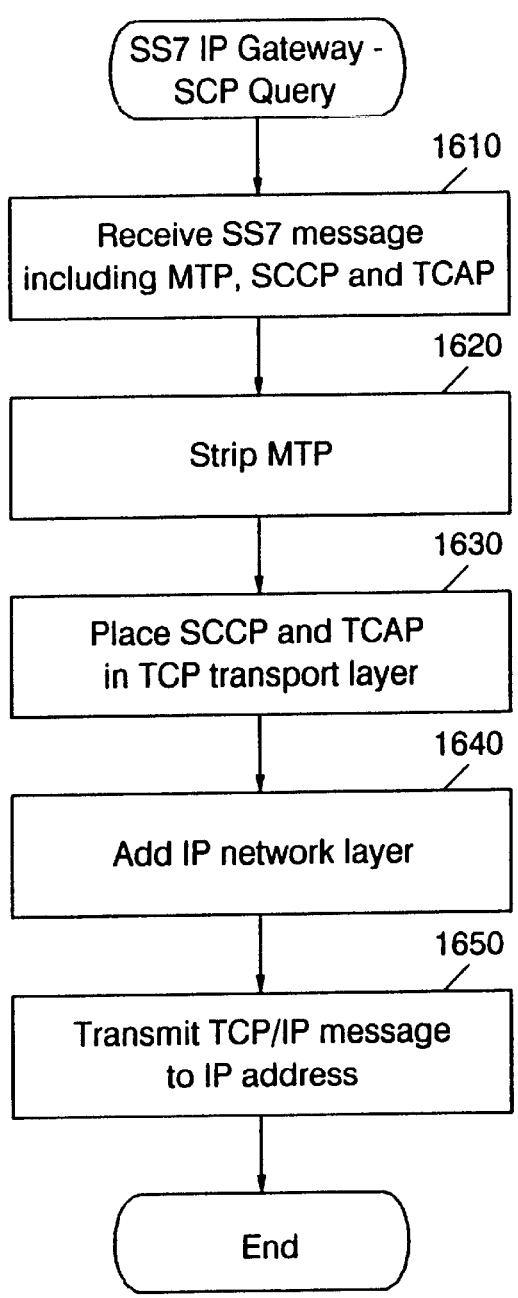
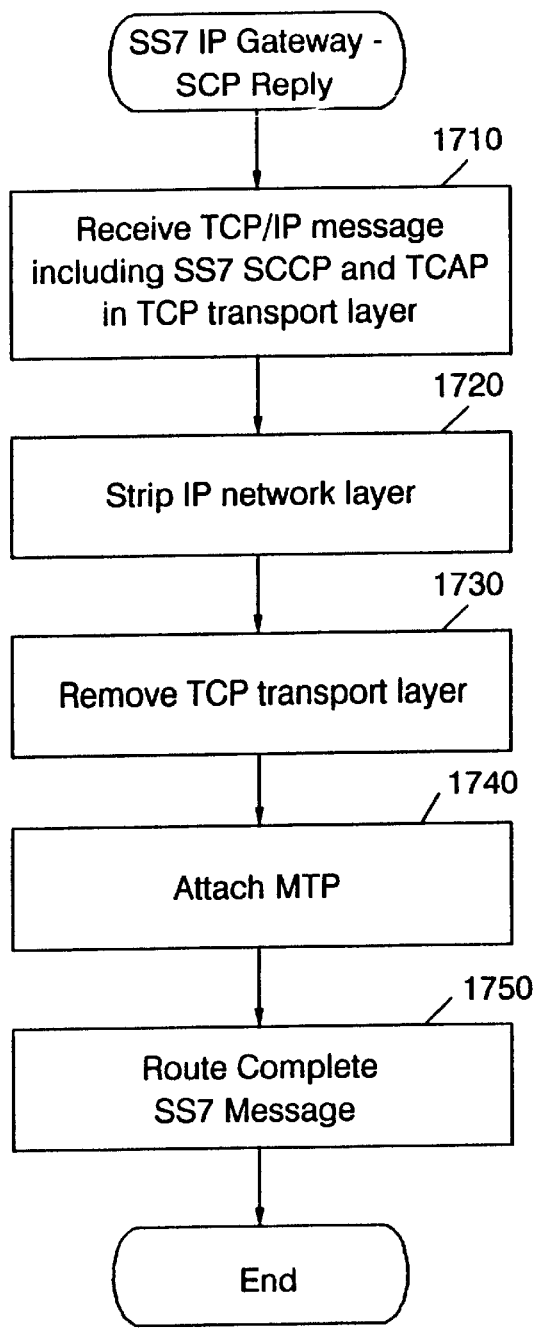

SYSTEMS AND METHODS FOR COMMUNICATING MESSAGES AMONG SIGNALING SYSTEM 7 (SS7) SIGNALING POINTS (SPS) AND INTERNET PROTOCOL (IP) NODES USING SIGNAL TRANSFER POINTS (STPS)

FIELD OF THE INVENTION

This invention relates to telecommunications systems and methods and more particularly to systems and methods for communicating in a Signaling System 7 network.

BACKGROUND OF THE INVENTION

Modern telecommunications networks generally include two separate communication pathways or subnetworks. The first is a voice network that handles the transmission of voice or other information between users. The second is a signaling network that facilitates the dynamic linking of a plurality of voice network circuits, such that a voice-type connection is established between a calling party and a called party. These functions are generically referred to as call setup and call teardown. Additionally, the signaling network provides a framework through which non-voice related information may be transported in a manner that is transparent to the user. This signaling technique is often referred to as "out of band" signaling, where the term "band" implies voice band. Common examples of such out of band data transport are the access of 800 number database services, calling card verification services and caller ID services.

In order to provide consistent and reliable communication across the signaling network infrastructure, a common or standard digital signaling protocol known as Signaling System 7 (SS7) has been developed. SS7 is an out of band common channel signaling system that uses labeled messages to transport circuit related signaling information, non-circuit related signaling information, network resident database service information and other information that may be used for the establishment of communication services.

From a hardware perspective, an SS7 network includes a plurality of SS7 nodes, generically referred to as Signaling Points (SP), that are interconnected using signaling links, also referred to as SS7 links At least three types of SPs are provided in an SS7 network: Service Switching Points (SSP), Signal Transfer Points (STP) and Service Control Points (SCP).

An SSP is normally installed in tandem or Class 5 offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed as mated pairs. Finally, SCPs control access to databases such as 800 number translation, 800 number carrier identification, credit card verification, etc.

Signaling datalinks are transmission facilities used to connect SPs together. They are dedicated bidirectional facilities operating at 56 kbps in the U.S. and Canada and at 64 kbps when clear channel capability is deployed. Normally, every link has a mate for redundancy and enhanced network integrity.

Signaling datalinks include access links or "A" links that connect SSPs to STPs and that connect SCPs to STPs, as shown in FIG. 1. Bridge links or "B" links are used to connect mated STPs to other mated STPs that are at the same hierarchical level, as shown in FIG. 2. Cross links or "C" links connect mated STPs together, as shown in FIG. 3. They are used for passing messages between STPs when signaling network failures are encountered.

Diagonal links or "D" links connect STPs of different hierarchical levels, as shown in FIG. 4. Extended links or "E" links connect SSPs to STPs that are not within their associated local STP area, as shown in FIG. 5. Finally, fully associated links or "F" links connect SSPs directly together without STPs, as shown in FIG. 6. FIG. 7 is a block diagram of a two-level SS7 network including a summary of possible link deployment.

SS7 also includes a network protocol. As a protocol, SS7 defines a hierarchy or structure of the information contained in a message or data packet that is transmitted between SPs of an SS7 network over signaling links. This internal data structure is often referred to as an SS7 protocol stack which includes the following four SS7 levels:

Level 1: The Physical Level
Level 2: The Datalink (or Link) Level
Level 3: The Network Level
Level 4: The User Level The physical level, also referred to as the Message Transfer Part (MTP) level 1, is the lowest or most fundamental level and is the first level that is used to interpret and process an incoming message. This level determines and/or provides the electrical characteristics to transmit the digital data over the interface being used. Following interpretation/processing, the incoming message is passed up the stack to the datalink level.

The datalink level, also referred to as MTP level 2, resides adjacent and above the physical level and is responsible for providing the SS7 link with error detection/correction and properly sequenced delivery of SS7 message packets. Following interpretation/processing, the incoming message is passed up the stack to the network level.

The network level, also referred to as MTP level 3, resides adjacent and above the datalink level and is responsible for message packet routing, message packet discrimination, and message packet distribution. Functionally, message discrimination determines to whom the message packet is addressed. If the message contains the local address of the receiving SP, then the message is passed on to message distribution. If the message is not addressed to the local SP, then it is passed on to the message router. Following interpretation/processing, the incoming message is passed up the stack to the user part level.

The user part level resides adjacent and above the network level. The user part level may include many distinct parts including a Transaction Capability Application Part (TCAP), an ISDN User Part (ISUP), and a Signaling Connection Control Part (SCCP).

The above description has assumed that an incoming message is being processed. An outgoing message is passed through the protocol stack in the opposite direction, entering at the user part level and exiting from the physical level. FIG. 8 illustrates SS7 protocol architecture relative to SS7 levels and relative to standard Open System Integration (OSI) layers. The hardware elements and protocols of an SS7 network are well known to those having skill in the art, and need not be described further herein.

A high performance STP is marketed by the assignee of the present application as the Eagle® STP. A block diagram of an Eagle® STP is shown in FIG. 9. A detailed description of the Eagle® STP may be found in the *Eagle® Feature Guide* PN/9110-1225-01, Rev. B, January 1998, published by Tekelec, the disclosure of which is hereby incorporated herein by reference. As described in this publication, an Eagle® STP 900 includes the following subsystems: a Maintenance and Administration Subsystem (MAS) 910, a communication subsystem 920 and an application subsystem 930. The MAS 910 provides maintenance communications, initial program load, peripheral services, alarm processing and system disks. The communication subsystem 920 includes an Interprocessor Message Transport (IMT) bus that is the main communication bus among all subsystems in the Eagle® STP 900. This high speed communications system functions as two 125 Mbps counter-rotating serial buses.

The application subsystem 930 includes application cards that are capable of communicating with the other cards through the IMT buses. Three types of application cards are presently included: a Link Interface Module (LIM) 950 that provides SS7 links and X.25 links, an Application Communication Module (ACM) that provides a TCP/IP interface over Ethernet, and an Application Service Module (ASM) 940 that provides global title translation, gateway screening and other services. A Translation Service Module (TSM) may also be provided for local number portability.

The LIM provides level 1 and some level 2 functions on SS7 signaling links. The ACM provides access to a remote host for an STP LAN feature, described below. The ACM provides unidirectional access from the STP to a remote host for the STP LAN feature. Unidirectional connection from the STP to a host is provided through an Ethernet LAN using TCP/IP protocol. Finally, the ASM provides additional memory that is used to store translation tables and screening data. A detailed description of the Eagle® STP is provided in the above cited Feature Guide and need not be described in detail herein.

A brief conceptual overview of the Eagle® STP is provided in the brochure entitled *Eagle® STP Platform*, Publication 908-0126-01, Rev. A, Tekelec, 1997. As described therein, the Eagle® STP is a high capacity, fully fault tolerant packet switch and self-contained local area network for exchanging data messages between a half-dozen to several hundred or more message processing modules. In the Eagle® STP system architecture, three functionally specific application subsystems access each other via a communications subsystem which includes dual counter-rotating, 125 Mbit/sec. IMT buses. The application subsystems include LIMs that provide SS7 and X.25 access to telecommunication signaling networks, ACMs that provide TCP/IP access to local area networks and a MAS that provides maintenance communication, peripheral services alarm processing and system disks. As stated in this brochure, "ACMs communicate directly with external, collocated service application systems via a TCP/IP, 10 Mbit/sec. LAN interface mounted on the Ethernet Interface Appliqué (EIA). Examples of external application systems include: an SCP not equipped with SS7 signaling links, a routing or charging database system, cellular/PCS home or visitor location registers (HLR, VLR), a message accounting system, a voice/record/image processing system, and other IN service nodes and peripherals that require direct interface via SS7 signaling links."

A detailed description of the operation of the Eagle® STP-LAN interface feature, which actually provides an ACM that communicates with an external LAN, is provided in the brochure entitled *Eagle® STP STP LAN Interface Feature*, Publication 908-0134-01, Rev. B, Tekelec 1997. As described therein, "The STP-LAN Interface Feature enables the collection of copies of SS7 messages that transit the EAGLE STP. This feature, along with user-provided data processing equipment, allows the EAGLE to perform functions beyond normal Signal Transfer Point (STP) functionality, such as auditing and accounting functions, message trap and trace and protocol conformance analysis. The EAGLE STP-LAN Interface Feature enables the user to connect external data collection or processing systems directly to the EAGLE STP via TCP/IP, 10 Mbits/sec. Ethernet LAN. It enables a user to select either ISUP messages, SCCP/TCAP messages, or both, for transfer to the external system. It also adds a time-stamp to identify the selected messages and their sequence for subsequent processing." As is also shown in this brochure, the Ethernet LAN link is a unidirectional link from the ACM to an external processor (host).

It is also known to interface an Eagle® STP to other networks using links other than SS7 links. For example, it is known to provide a database transport access feature that intercepts message signaling units originating from an X.25 network. See the brochure entitled *Eagle® STP Database Transport Access Feature*, Publication 908-0136-01, Rev. B, Tekelec, 1997.

It is also known to use protocol converters in connection with STPs. For example, the Eagle® STP X.25 Protocol Conversion Feature provides interfacing and connectivity between nodes on an SS7 network and nodes on an X.25 network. See the brochure entitled *Eagle® STP X.25 to SS7-IS.41 Protocol Conversion Feature*, Publication 908-0135-01, Rev. B, Tekelec, 1997. Similarly, it is known to provide an ANSI-ITU gateway to enable an Eagle® STP to interconnect to other types of signaling networks. See the brochure entitled *Eagle® STP ANSI-ITU Gateway Feature*, Publication 908-0133-01, Rev. B, Tekelec, 1997.

Protocol converters are also known for translating protocols between SS7 and non-SS7 networks. For example, the Tekelec SS7 -Frame Relay Access Device (FRAD) translates SS7 protocol information between an SS7 network and a frame relay network. See the brochure entitled *SS7-Frame Relay Access Device SS7 Protocol Information Translator*, Publication 908-0167-01, Rev. A, Tekelec, 1997.

Protocol conversion for SS7 networks is also described in U.S. Pat. No. 5,793,771 to Darland et al., entitled "Communication Gateway". This patent describes a system and method for protocol translation. The system includes an SS7 Module for sending and receiving a plurality of incoming and outcoming SS7 queries and responses. The system also includes an Inbound Subsystem Module, coupled to the SS7 Module, for translating the incoming SS7 queries from an SS7 protocol to a non-SS7 protocol. The translated incoming queries are forwarded to an end user while in the non-SS7 protocol. The Inbound Subsystem Module also translates any responses corresponding to the incoming SS7 queries from the non-SS7 protocol to the SS7 protocol. The system further includes an Outbound Subsystem Module, coupled to the SS7 Module, for translating outgoing SS7 queries from the non-SS7 protocol to the SS7 protocol. The translated outgoing queries are sent via the SS7 module across an SS7 network. The Outbound Subsystem Module also translates SS7 responses corresponding to the outgoing SS7 queries from the SS7 protocol to the non-SS7 protocol. The translated responses corresponding to the outgoing SS7 queries are forwarded to an end user while in the non-SS7 protocol. See also U.S. Pat. No. 5,706,286 to Reiman et al., entitled "SS7 Gateway" and U.S. Pat. No. 5,640,446 to Everett et al., entitled "System and Method of Validating Special Service Calls Having Different Signaling Protocols."

Unfortunately, the dedicated SS7 links that connect an STP to other SPs of an SS7 network can be capital intensive and expensive to maintain. Moreover, since redundant SS7 datalinks are generally used, the cost of these links can be even more capital intensive and expensive to maintain. These expenses can be a barrier to further expansion of wired telephone networks and/or cellular telephone networks.

For example, when cellular service providers enter a new geographic area or market, the cellular service providers generally need to connect the elements of a cellular radiotelephone network to the wired telephone network, also referred to as the Public Switched Telephone Network (PSTN). Therefore, a connection between a Mobile Switching Center (MSC) which is a type of SSP, and at least one associated STP, uses at least one SS7 A-link. Since most SPs are connected to the SS7 network via a mated pair of STPs, the number of the SS7 datalinks may double.

Similar considerations may apply to wired service providers that enter into or expand in a geographic area or market. The large number of SS7 links that need to be provided can increase the expansion cost for wired and wireless networks, thereby increasing consumer cost and/or reducing consumer access to competitive service providers.

SUMMARY OF THE INVENTION

It is therefore an object of the present invention to provide improved systems and methods for communicating messages using STPs.

It is another object of the present invention to provide improved systems and methods for communicating SS7 messages between an STP and other SPs of an SS7 network.

It is yet another object of the present invention to provide improved systems and methods for communicating SS7 messages between an STP and other SPs of an SS7 network, which can reduce the capital and maintenance expenses of connecting an STP to other SPs of an SS7 network.

These and other objects are provided according to the present invention by providing seamless transport of messages between SS7 network elements and Internet Protocol (IP) network elements using an STP as an intermediary. Thus, messages may be routed between a first SP and a second SP via an STP using IP. Messages may be routed between an SP and an IP node via an STP using IP. Messages also may be routed between a first IP node and a second IP node via an STP using IP. Thus, the STP can be used as a vehicle for message transport among nodes of an SS7 network, among nodes of an IP network and between SS7 and IP networks.

Accordingly, messages may be communicated to and from an STP by bidirectionally communicating messages to and from the STP using IP. Bidirectional communication may take place between a first SP and a second SP of an SS7 network via the STP using IP. Alternatively, bidirectional communication may take place between an SP and an IP node via the STP using IP. In another alternative, bidirectional communication may take place between a first IP node and a second IP node via the STP using IP. Thus, the STP can act as a communication router for nodes that are entirely within an IP network, entirely within an SS7 network or between SS7 networks and IP networks.

Stated differently, an STP for an SS7 network bidirectionally transfers SS7 messages among SPs of the SS7 network. An STP also bidirectionally transfers messages between SPs of the SS7 network and IP nodes of an IP network. An STP also bidirectionally transfers messages among IP nodes of the IP network. Multifunction STPs are thereby provided. Bidirectional transfer of messages preferably take place using Transmission Control Protocol/Internet Protocol (TCP/IP).

In particular, SS7 messages are bidirectionally communicated between an STP and at least one other SP of an SS7 network and/or an IP node in an IP network, using IP, preferably TCP/IP. In a preferred embodiment of the invention, SS7 messages are bidirectionally communicated between an STP and at least one SCP using IP. SS7 messages may also be communicated between an STP and at least one SSP and between an STP and at least a second STP such as a second mated STP, using IP and preferably using TCP/IP. Messages also may be communicated to and from IP nodes, and among IP nodes, using the STP.

As will be understood by those having skill in the art, IP and IP-based networks have become a backbone for the data communications industry. Moreover, an IP network is capable of simultaneously transporting data for more than one network node at a time. Thus, many SPs can be connected to a single physical IP link. The single IP link, carrying traffic from multiple SPs, can be connected to an STP. Accordingly, the number of physical SS7 links that may be required to connect an STP to an SS7 network may be reduced greatly. Moreover, since there are generally a limited number of physical links that a fully equipped STP can provide, the ability to reduce the effective ratio of signaling links per connected SP can allow for a more efficient use of STP resources, which can yield a significant cost savings for the STP.

An STP according to the present invention receives an SS7 formatted message over an SS7 link, dynamically converts or translates this message into TCP/IP format, and routes the reformatted message over an associated IP link to a destination residing within an IP network. Conversely, an STP also receives TCP/IP formatted messages over an IP link, dynamically converts or translates this message into SS7 format, and routes the reformatted message over an associated link to a destination residing within the SS7 signaling network. The TCP/IP formatted messages may originate from, or be routed to, an SP or an IP node.

In order to accomplish this translation, an STP according to the present invention can employ an SS7-to-IP primitive that can allow for mapping of the SS7 data and services presented in the MTP protocol stack into the IP protocol stack and vise versa. In particular, a first SS7 message that is received from the STP includes an SS7 Message Transfer Part (MTP) layer, an SS7 Signaling Connection Control Part (SCCP) layer and an SS7 Transaction Capability Application Part (TCAP) layer. The MTP layer (SS7 levels 1–3) is stripped from the first SS7 message. An IP routing layer is added to the SSCP layer and the TCAP layer that remain in the first SS7 message, to create a first IP message. The IP routing layer includes an IP address. The first IP message is transmitted to the IP address over an IP network.

A second IP message is received from the IP network, that originates from an SP or an IP node. The second IP message includes an SS7 SCCP layer, an SS7 CAP layer and an IP routing layer. The IP routing layer is stripped from the second IP message and the MTP layer is added, so as to create a second SS7 message including an SS7 SCCP layer and an SS7 TCAP layer. The second SS7 message is then transferred to the STP.

The communications described above allow for translation between SS7 protocol and any transport protocol in the IP domain such as TCP/IP or UDP/IP. In a preferred embodiment of the present invention, the translation is between SS7 and TCP/IP. In particular, a first SS7 message is received from the STP. The first SS7 message includes an SS7 MTP level, an SS7 SCCP level and an SS7 TCAP level. The MTP level is stripped from the first SS7 message. The SCCP level and the TCAP level that remain in the first SS7 message are placed in a TCP transport layer to create a first TCP message. An IP network layer is added to the first TCP message to create a first TCP/IP message. The IP network layer includes an IP address The first TCP/IP message is transmitted to the first IP address over an IP network using TCP transport.

A second TCP/IP message is received from the IP network, originating from an SP or an IP node. The second TCP/IP message includes an SS7 SCCP level and an SS7 TCAP level in a TCP transport layer and an IP network layer. The IP network layer is stripped from the second IP message and the MTP layer is attached, so as to create a second TCP message including the SS7 SCCP level and the SS7 TCAP level. The TCP transport layer is removed from the second TCP message to create a second SS7 message including an SS7 SCCP level and an SS7 TCAP level. Finally, the second SS7 message is transferred to the STP.

From a system standpoint, the present invention may be provided as an SP for an SS7 network. The SP comprises an STP that transfers SS7 messages between other SPs of the SS7 network and an STP IP gateway that is connected to, and preferably is part of, the STP to communicate at least some of the transferred SS7 messages between the STP and other SPs of the SS7 network using IP. The STP and STP IP gateway preferably are integrated into a single unit.

The STP preferably comprises an Interprocessor Message Transport (IMT) bus and a plurality of Link Interface Modules (LIM) that are connected to the IMT bus. Each of the LIMs are connected to at least one other SP of the SS7 network. The LIMs communicate with one another via the IMT bus to transfer SS7 messages between the other SPs of the SS7 network.

The STP IP gateway preferably comprises a Data Communications Module (DCM) that is connected to the IMT bus and to an IP network, to map SS7 messages between SS7 and IP and thereby transfer SS7 messages between the STP and at least one other SP of the SS7 network or an IP node using IP. The DCM can operate as described above to strip the MTP layer and add an IP routing layer and an optional TCP transport layer, and conversely to strip an IP routing layer and a TCP transport layer from received messages while adding an MTP layer so as to create SS7 messages including an SCCP level and TCAP level. Accordingly, low cost IP connections may be provided for an STP, to replace at least some of the SS7 links and thereby allow lower capital investment and lower maintenance cost.

BRIEF DESCRIPTION OF THE DRAWINGS

FIGS. 17 and 18 are flowcharts illustrating bidirectional communication of SS7 messages between an STP and at least one other SP according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
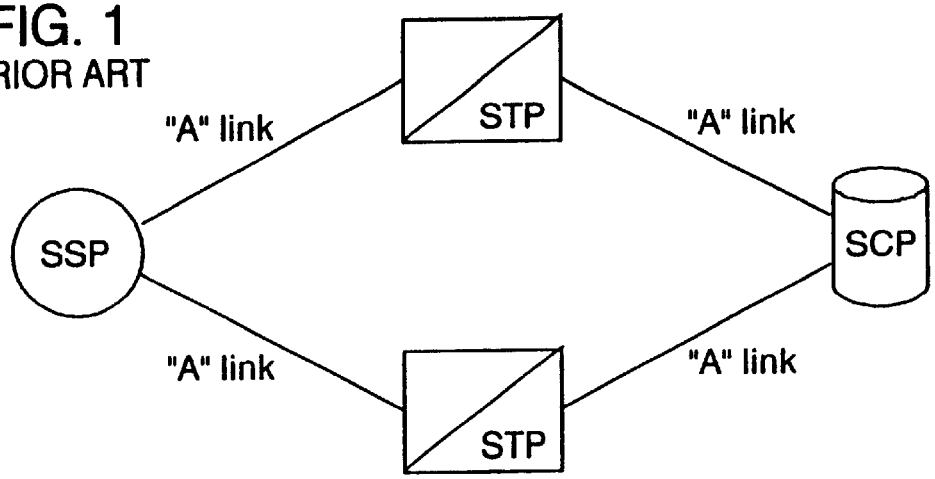
FIGS. 1–7 illustrate signaling datalinks and SPs of an SS7 network.
Figure 2:
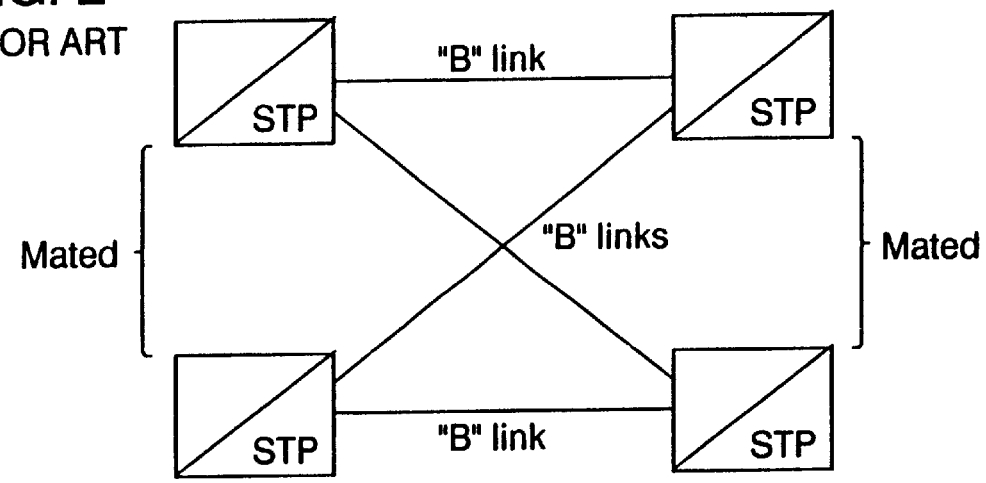
Figure 3:
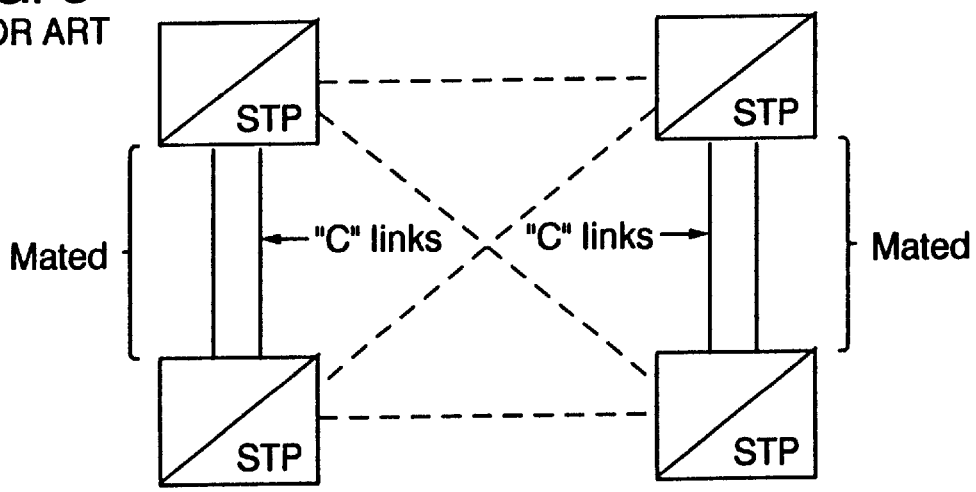
Figure 4:
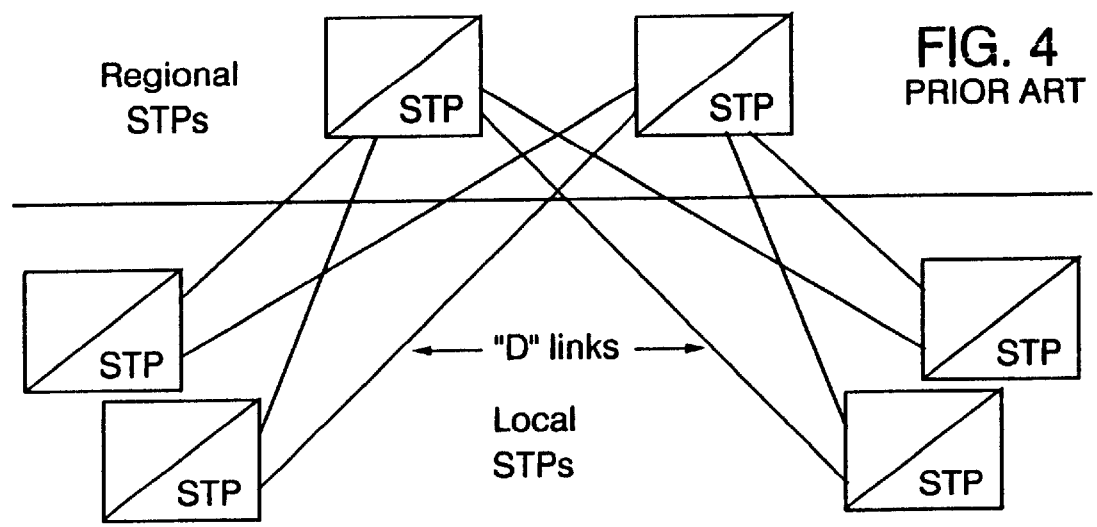
Figure 5:
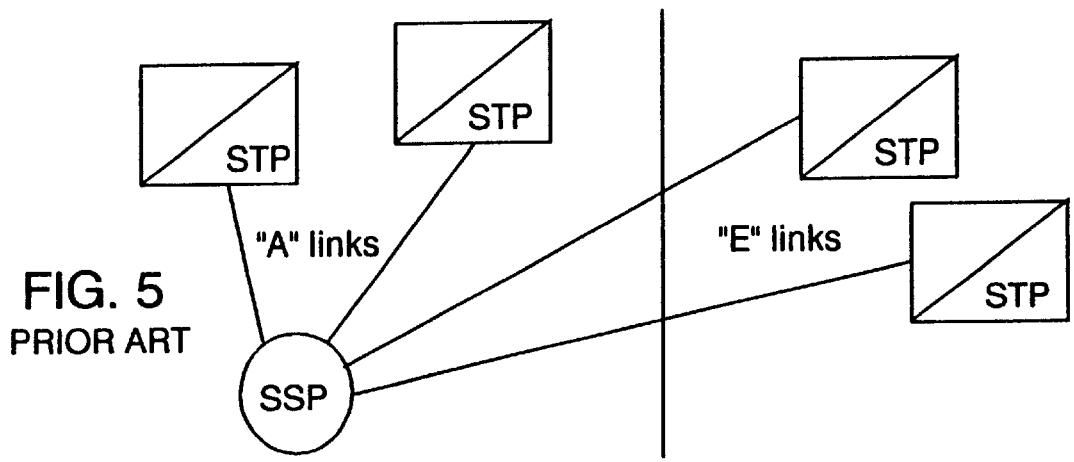
Figure 6:
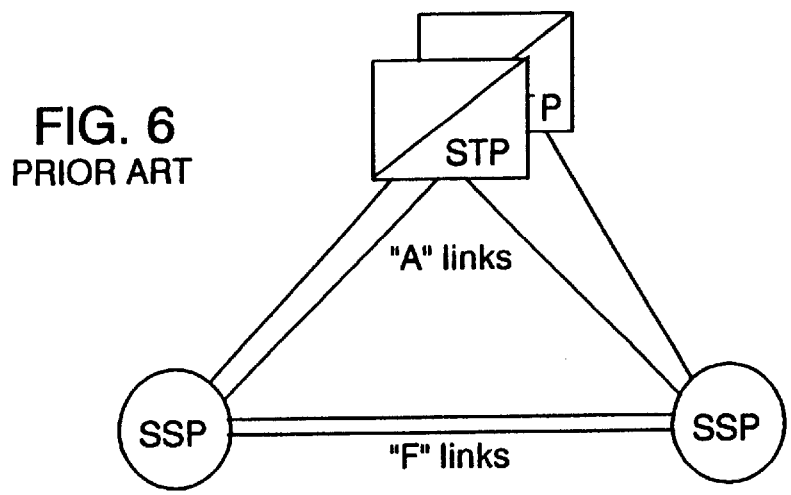
Figure 7:
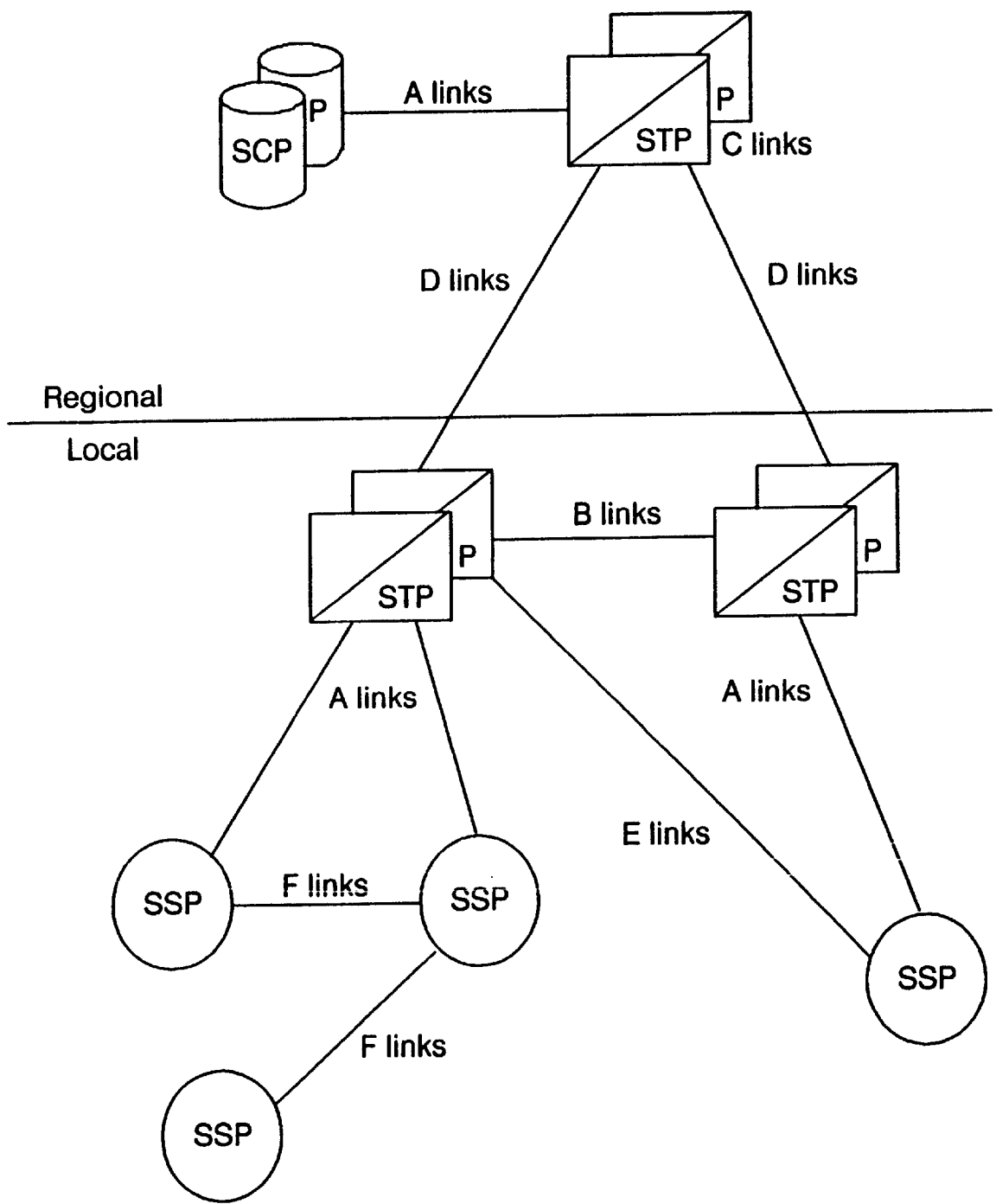
Figure 8:
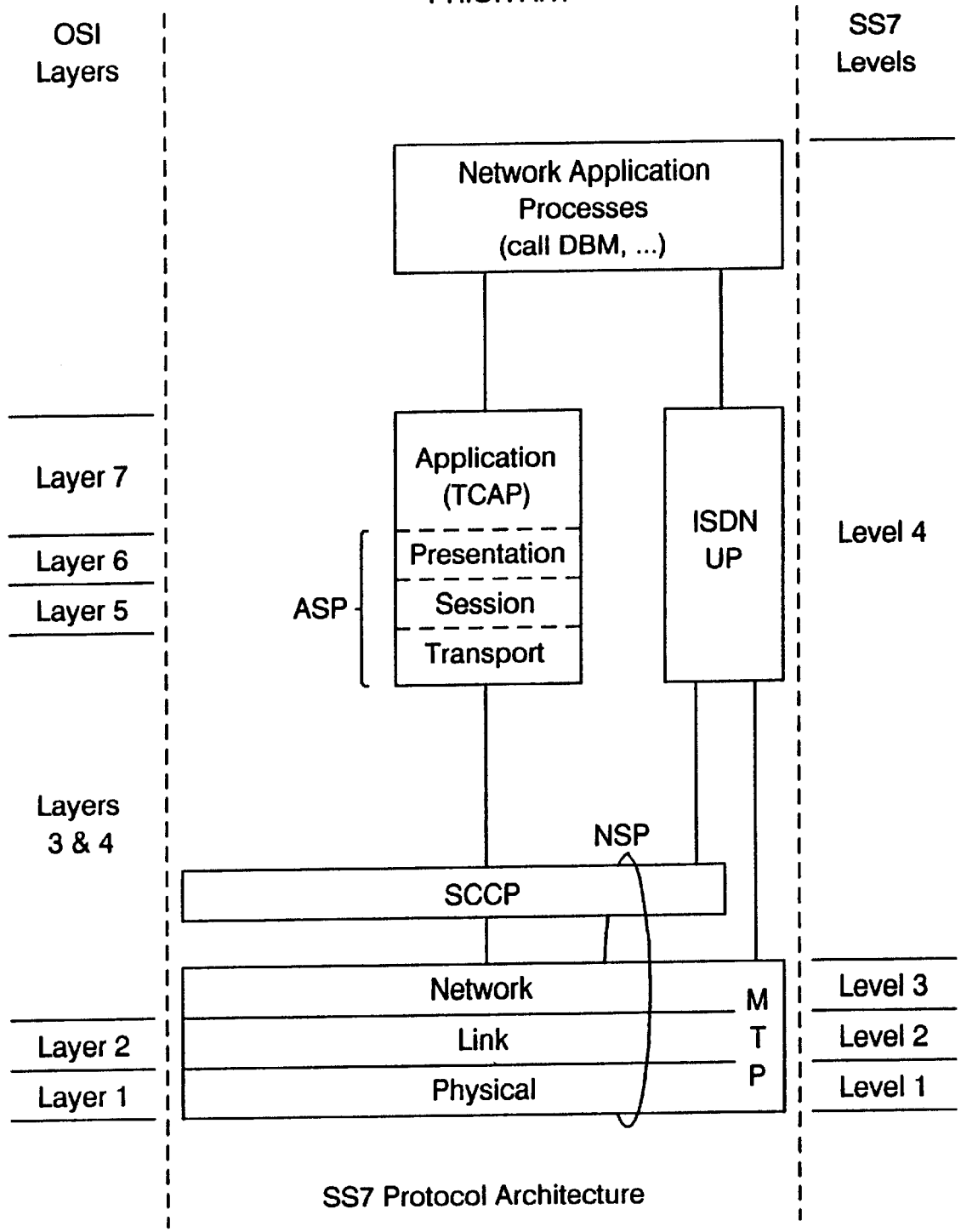
FIG. 8 illustrates SS7 protocol architecture relative to SS7 levels and relative to standard Open System Integration (OSI) layers.
Figure 9:
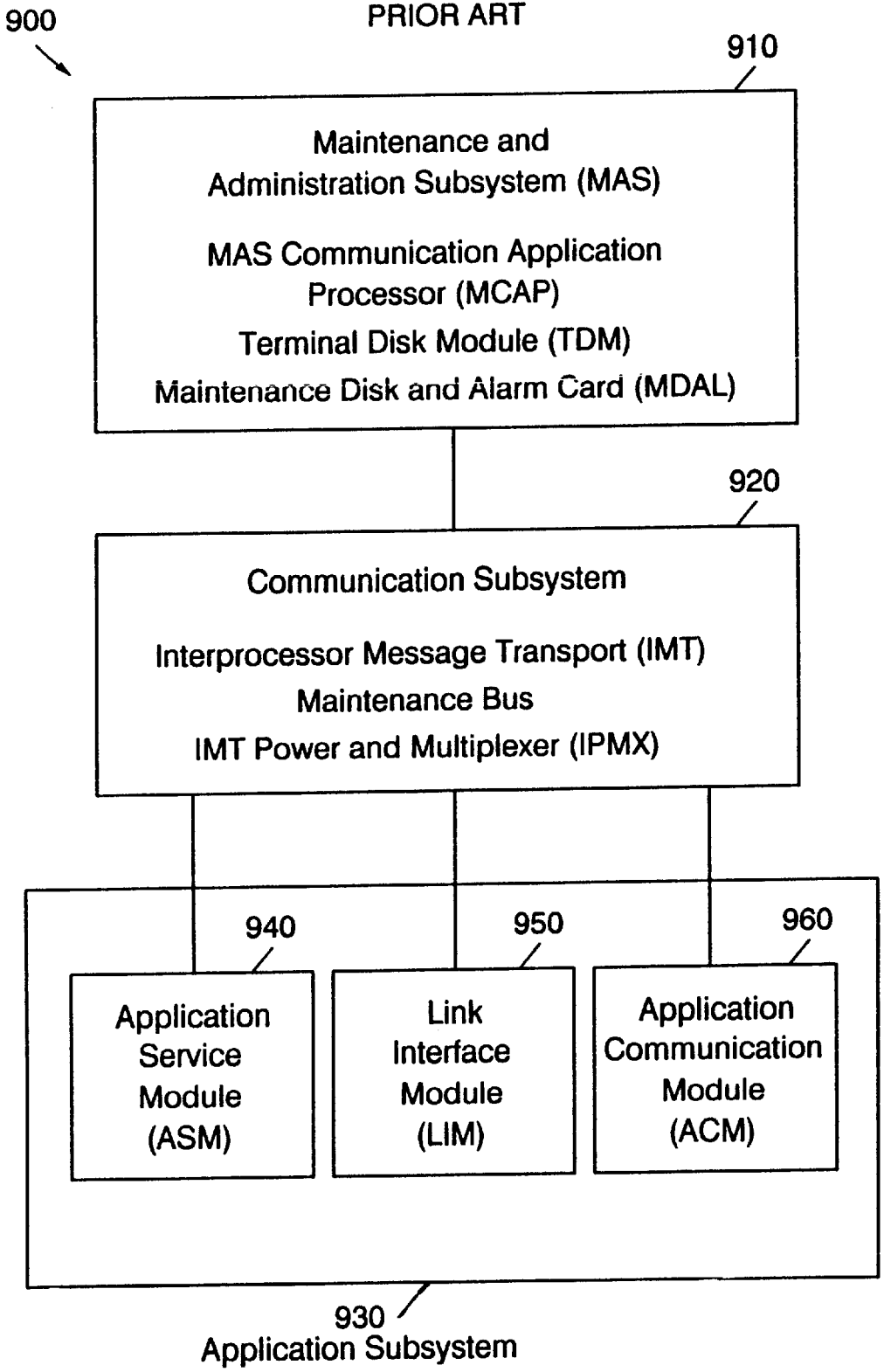
FIG. 9 is a block diagram of an Eagle® STP.
Figure 10:
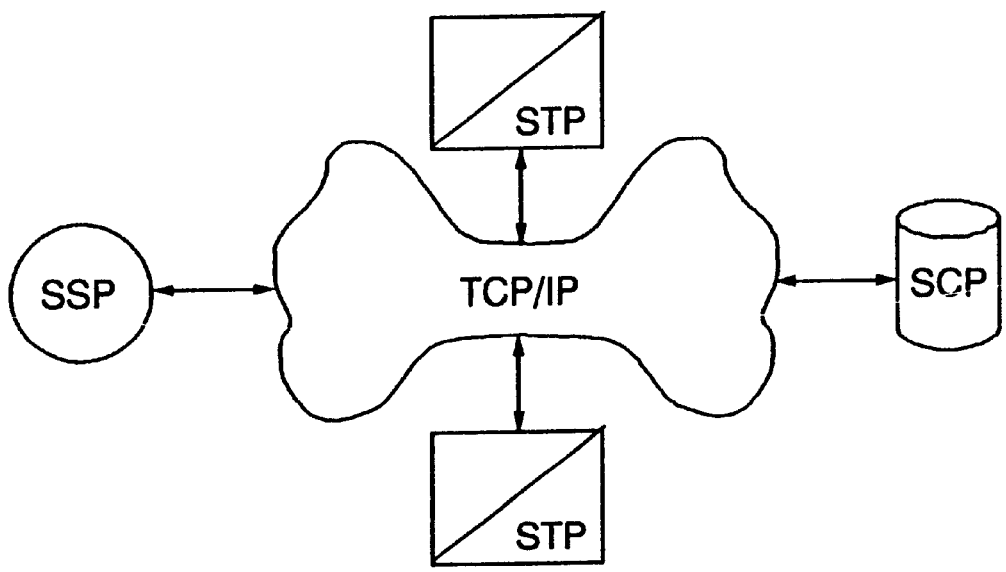
FIGS. 10–14 are block diagrams illustrating bidirectional communication of SS7 messages between an STP and at least one of the other SPs in an SS7 network using TCP/IP according to the present invention.

FIGS. 10–14 are block diagrams illustrating bidirectional communication of SS7 messages between an STP and at least one of the other SPs in an SS7 network using TCP/IP according to the present invention. More specifically, FIG. 10 illustrates bidirectional communication of SS7 messages between an STP and at least one SCP using TCP/IP, to thereby replace SS7 A links with TCP/IP links. FIG. 10 also illustrates bidirectional communication between an STP and an SSP using TCP/IP, also replacing SS7 A links.

Figure 11:
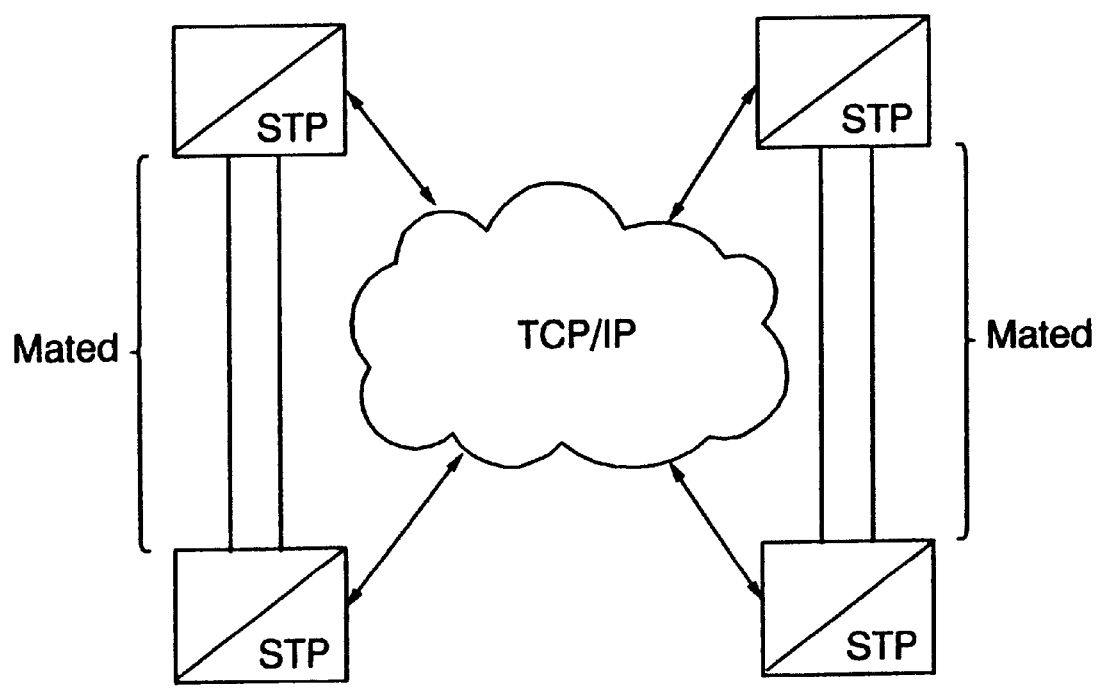
Figure 12:
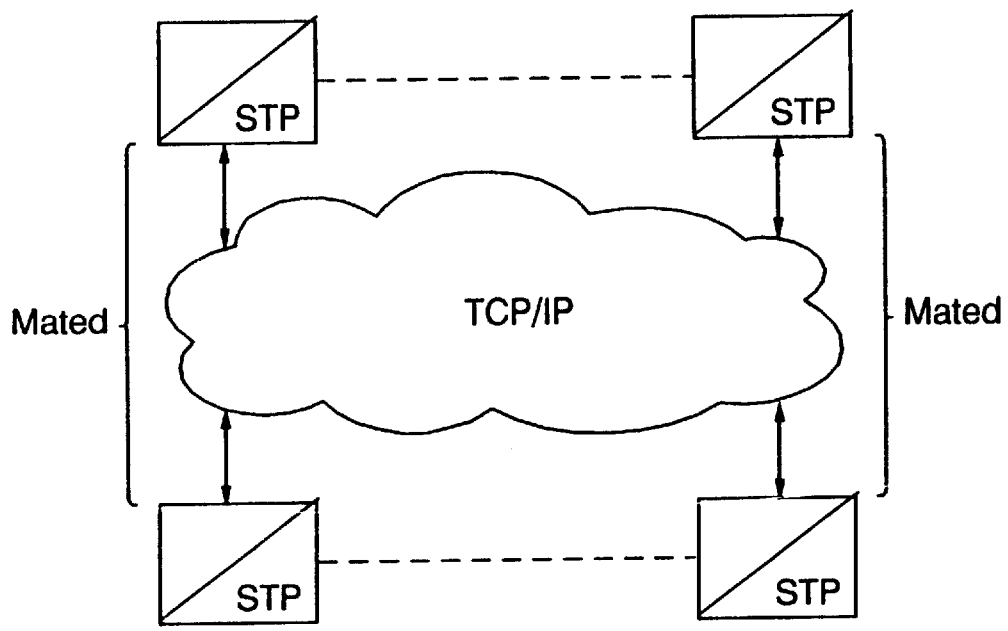
Figure 13:
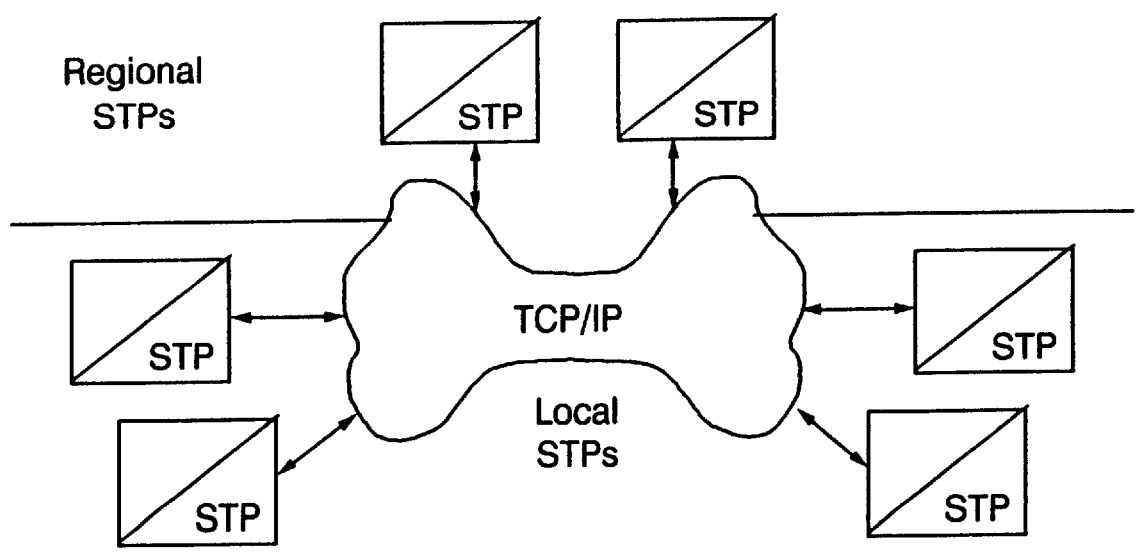

FIG. 11 illustrates bidirectional communication between STPs that are at the same hierarchical level, replacing SS7 B links with TCP/IP links. FIG. 12 illustrates bidirectional communication between mated STPs using TCP/IP, replacing SS7 C links with TCP/IP links. FIG. 13 illustrates bidirectional communication between STPs of different hierarchical levels using TCP/IP links, replacing D links with TCP/IP links.

Figure 14:
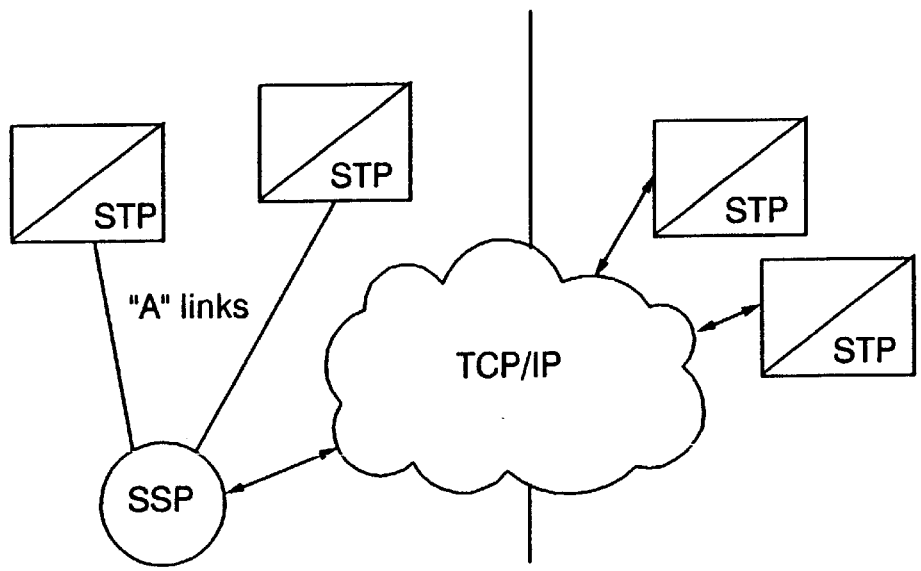

Finally, FIG. 14 illustrates bidirectional communication of SS7 messages between STPs and SSPs that are not within their associated local STP area using TCP/IP, replacing E links with TCP/IP links. It will also be understood by those having skill in the art that TCP/IP can be used to replace combinations of A through E links by combining one or more of FIGS. 10–14.

Figure 15:
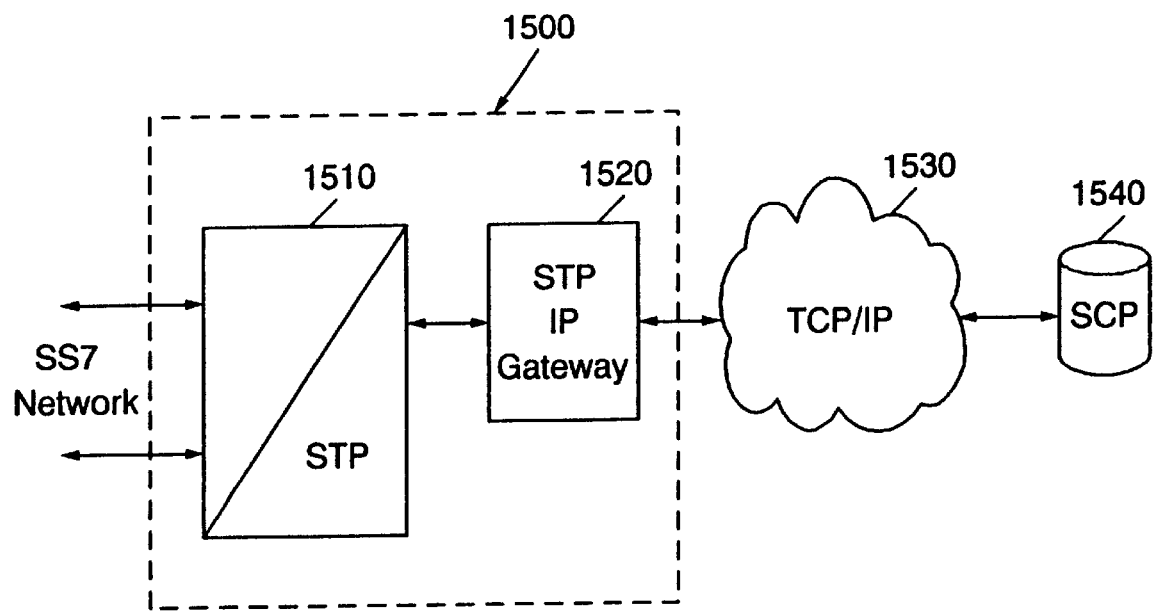
FIG. 15 is a block diagram of an SP according to the present invention.

FIG. 15 is a block diagram of an SP 1500 according to the present invention. The SP 1500 may also be referred to as a "node" of an SS7 network. As shown in FIG. 15, the SP 1500 includes an STP 1510 that transfers messages between other SPs of the SS7 network. The SP 1500 also includes an STP/IP gateway 1520 that is connected to the STP 1510 to bidirectionally communicate at least some of the transferred SS7 messages between the STP 1510 and at least one of the other SPs of the SS7 network using an IP network and preferably using a TCP/IP network 1530. The STP/IP gateway 1520 preferably is a component of an STP 1510. Although the component may be sold separately, it is preferably embodied as one or more cards that can integrate into an STP 1510. In a preferred embodiment shown in FIG. 15, the TCP/IP network 1530 is used to bidirectionally communicate SS7 messages between the STP 1510 and an SCP 1540. However, bidirectional communication with other SPs may also take place using the STP/IP gateway 1520 and TCP/IP network 1530.

Figure 16:
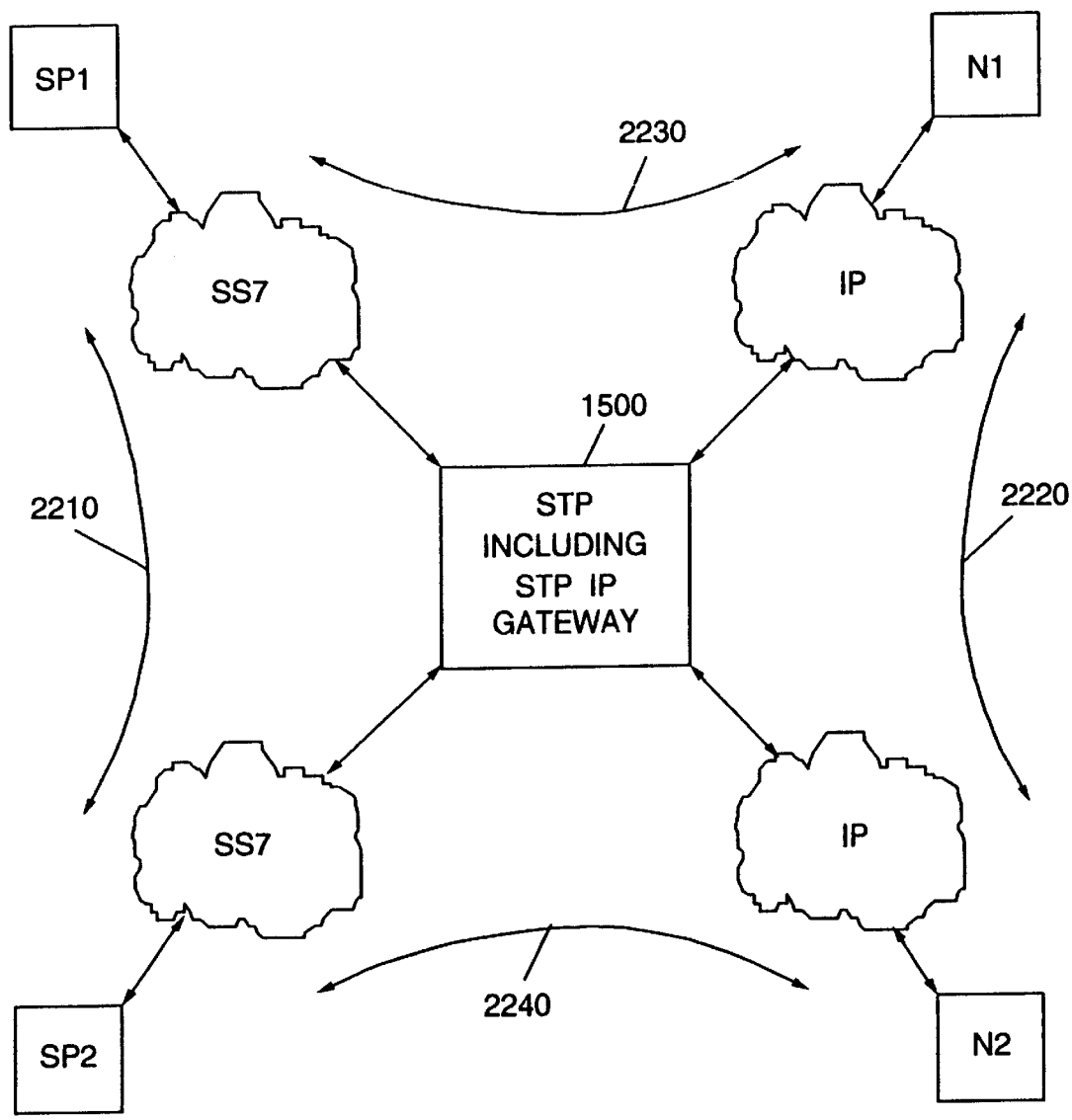
FIG. 16 is a block diagram illustrating bidirectional transport among SS7 and IP network elements using an STP according to the present invention.

The present invention also may be used to provide seamless transport among SS7 network elements, and among IP network elements. For example, as shown in FIG. 16, an SP 1500 that comprises an STP and an STP IP gateway may be used to bidirectionally communicate SS7 messages and other messages between a first signaling point SP1 and a second signaling point SP2 of two separate SS7 networks as shown by the bidirectional arrow 2210. Moreover, the SP1500 also may be used to bidirectionally communicate SS7 messages or other messages between a first IP node N1 and a second IP node N2 via one or more IP networks, as shown by bidirectional arrow 2220.

Finally, as shown by bidirectional arrows 2230 and 2240, the SP1500 may be used to communicate SS7 messages or other messages between signaling points SP1 and SP2 and IP nodes N1 and N2. Thus, an STP including an STP IP gateway can become a router for communicating messages among SPs in an SS7 network, between SPs in an SS7 network and nodes in an IP network, and among nodes in an IP network. Seamless transport between SS7 and IP network elements may thereby be provided using an STP with an IP gateway.

Accordingly, an STP for an SS7 network according to the present invention includes means for and provides the steps of, bidirectionally transferring SS7 messages among SPs of the SS7 network. The STP also includes means for and provides the steps of bidirectionally transferring messages between SPs of the SS7 network and IP nodes of an IP network. The STP also includes means for and provides the steps of, bidirectionally transferring messages among IP nodes of the IP network. Bidirectional transfer preferably takes place using TCP/IP.

FIGS. 17 and 18 are flowcharts and FIGS. 19–22 are block diagrams illustrating bidirectional communication of SS7 messages between the STP 1510 and at least one of the other SPs of an SS7 network, such as SCP 1540, by STP/IP gateway 1520 using TCP/IP network 1530. As will be appreciated by one of skill in the art, the present invention may be embodied as methods, systems (apparatus), and/or computer program products. Accordingly, the present invention may take the form of an entirely hardware embodiment, an entirely software embodiment or an embodiment combining software and hardware aspects.

It will also be understood that one or more blocks of FIGS. 17–22, and combinations of these blocks, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks in FIGS. 17–22 support combinations of means for performing the specified functions, combinations of steps for performing the specified functions and program instruction means for performing the specified functions. It will also be understood that each block, and combinations of blocks, can be implemented by special purpose hardware-based computer systems which perform the specified functions or steps, or by combinations of special purpose hardware and computer instructions.

Referring now to FIG. 17, communicating SS7 messages from an STP to another SP of an SS7 network using STP/IP gateway 1520 will now be described. In order to replace an A link between an STP 1510 and an SCP 1540, FIG. 17 illustrates an SCP query from an STP 1510 to an SCP 1540.

Referring now to FIG. 17 at Block 1610, an SS7 message is received from the STP 1510. The SS7 message includes an SS7 MTP level, an SS7 SCCP level and an SS7 TCAP level. As shown at Block 1620, the MTP is stripped from the SS7 message. As shown in Block 1630, the SCCP level and the TCAP level that remain in the SS7 message are placed in a TCP transport layer to create a TCP message. As shown in Block 1640, an IP network layer is added to the TCP message to create a TCP/IP message. The IP network layer includes an IP address. Finally, at Block 1650, the TCP/IP message is transmitted to the IP address over an IP network 1530 using TCP transport. Thus, a query is sent from the STP 1510 to the SCP 1540 using TCP/IP network 1530 and STP/IP gateway 1520.

FIG. 18 illustrates an SCP reply from the SCP 1540 to the STP 1510 using the TCP/IP network 1530 and the STP/IP gateway 1520 to replace SS7 A links. As shown in Block 1710, a TCP/IP message is received from the IP network 1530. The TCP/IP message includes SS7 SCCP and TCAP levels in a TCP transport layer and an IP network layer. At Block 1720, the IP network layer is stripped from the IP message to create a TCP message including the SS7 SCCP level and the SS7 TCAP level in a TCP transport layer. At Block 1730, the TCP transport layer is removed from the TCP message to create an SS7 message including an SS7 SCCP level and an SS7 TCAP level. At Block 1740, the MTP is attached. Finally, at Block 1750, the SS7 message is routed. Thus, an SCP reply is sent from the SCP 1540 to the STP 1510 using the TCP/IP network 1530 and the STP/IP gateway 1520 rather than an SS7 A link.

Figure 19:
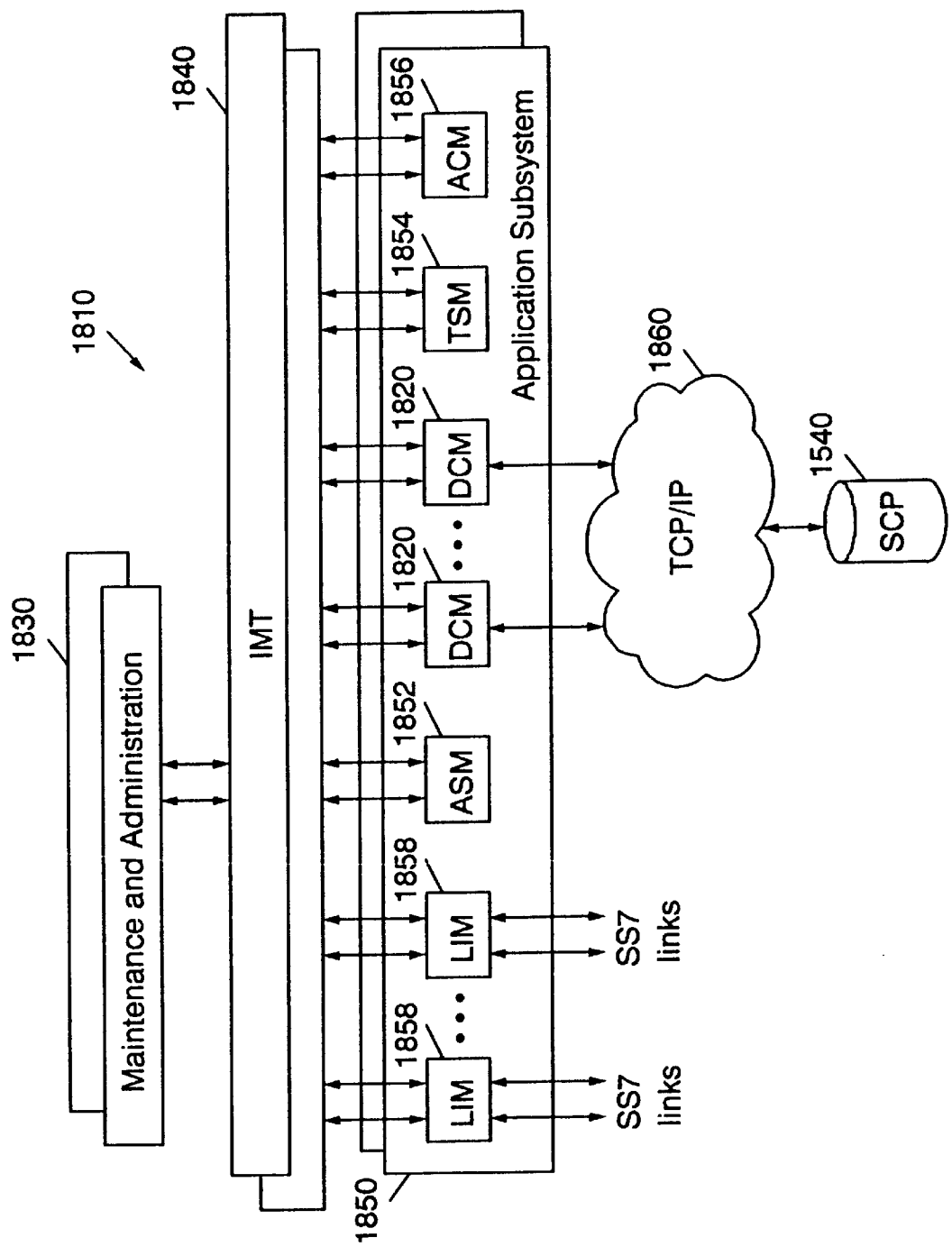
FIG. 19 is a block diagram of an Eagle® STP that includes an STP/IP gateway according to the present invention.

FIG. 19 is a block diagram of an Eagle® STP that includes an STP/IP gateway 1520. As shown in FIG. 19, an Eagle® STP 1810 includes three cooperating subsystems: the Maintenance and Administration Subsystem (MAS) 1830, a communication subsystem comprising a pair of counter rotating Interprocessor Message Transport (IMT) buses 1840 and at least one application subsystem 1850. The application subsystem 1850 may include a plurality of modules. For example, at least one Application Service Module (ASM) 1852 is used to store translation tables and screening data for gateway screening. At least one Translation Service Module (TSM) 1854 that is used for global title translation may be included. At least one Application Communication Module (ACM) 1856 provides unidirectional access to a remote host for STP-LAN functionality. At least one Link Interface Module (LIM) 1858 provides a physical input/output terminal for two SS7 links. The architecture of an Eagle® STP as described in this paragraph is well known to those having skill in the art and need not be described further herein.

According to the invention, an SCP/IP gateway is added by adding at least one Data Communications Module (DCM) 1820. The DCM performs bidirectional SS7 to TCP/IP protocol stack mapping as previously described. As shown in FIG. 19, each DCM 1820 interfaces with both the IMT bus 1840 and an associated TCP/IP network 1860. By interfacing with the IMT bus 1840, high speed communications may be obtained with other modules in the Eagle® STP 1810.

Figure 20:
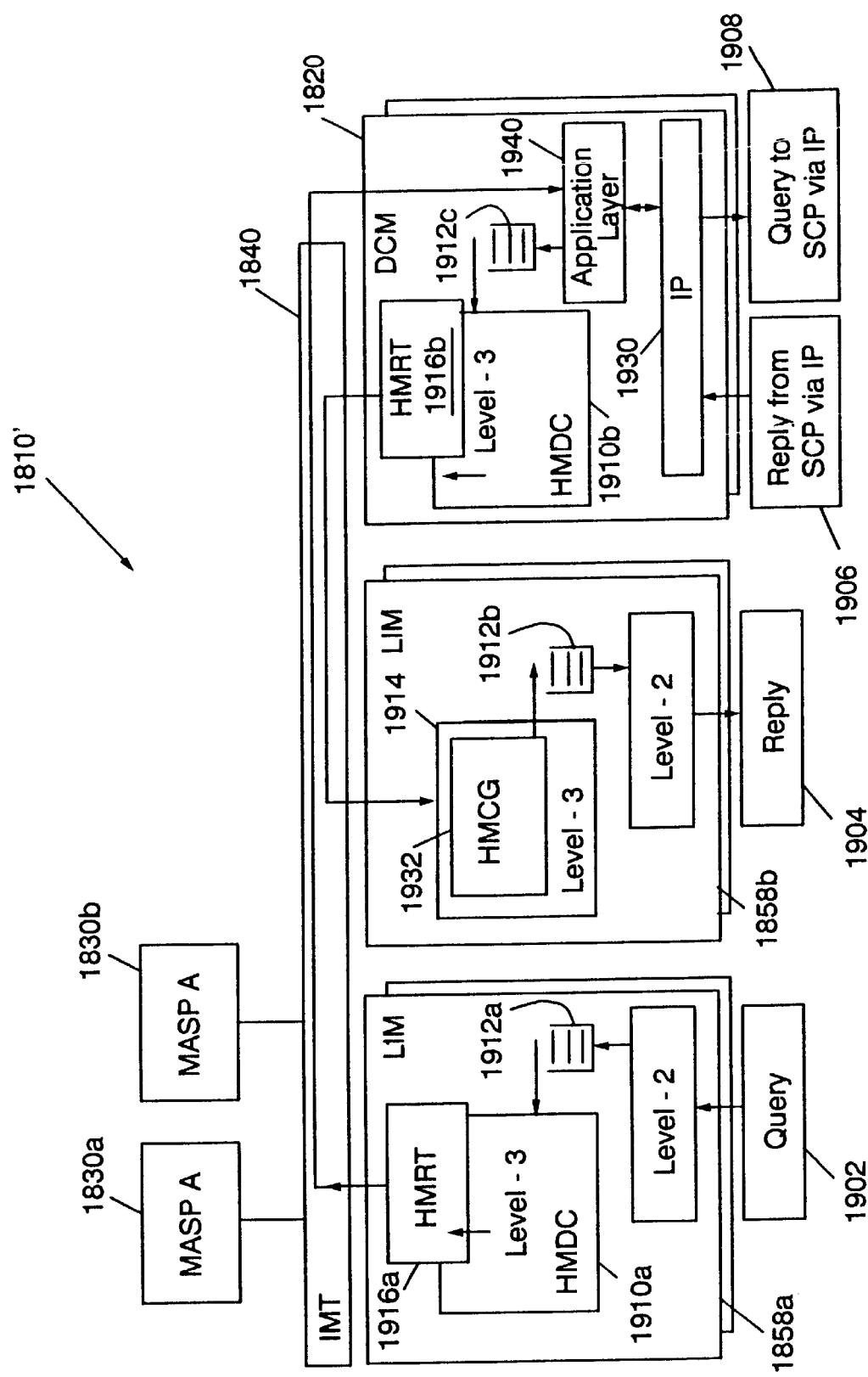
FIGS. 20 and 21 are detailed block diagrams illustrating bidirectional communications over an Eagle® STP according to the present invention for processing an SS7 query and an SS7 reply.
Figure 21:
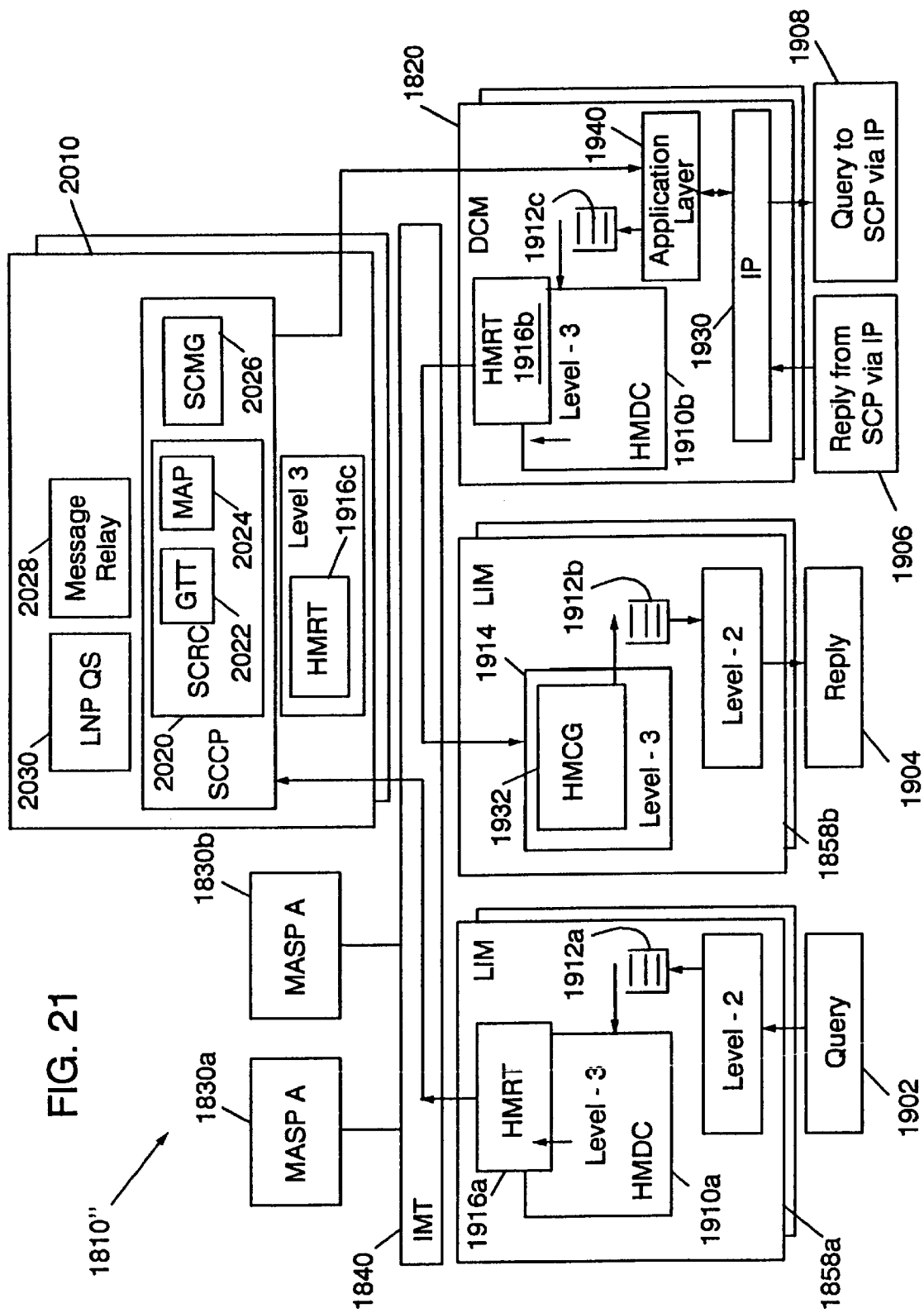

FIG. 20 is a detailed block diagram illustrating bidirectional communications over an Eagle® STP 1810' according to the present invention, for processing an SS7 query and an SS7 reply through a DCM 1820. In FIG. 20, Global Title Translation (GTT) is not shown. In FIG. 21, an Eagle® STP is configured with a GTT-supporting TSM.

Referring now to FIG. 20, the LIMs 1858*a* and 1858*b* and the DCM 1820 each comprise combinations of SS7 functions including Message Handling Discrimination (HMDC) functions, Message Handling Distribution (HMDT) functions, Message Handling Congestion (HMGC) functions and Message Handling Routing (HMRT) functions. As is well known to those having skill in the art, an HMDC function determines if a received MSU is destined for the STP itself and should be processed at the STP or if the MSU is being routed through the STP to a destination. An HMDT function distributes a message that is intended for the STP itself to the proper application in the STP. An HMGC function monitors when the SP is becoming too busy. Congestion procedures exist to detect the problem and then shed loads and try to fix the problem. An HMRT function determines the signaling link over which the outgoing message is sent.

Still referring to FIG. 20, assume an SS7 query 1902 arrives at the LIM 1858*a*. The level 2 Link Level is removed and the message is queued in a queue 1912*a*. The HMDC 1910*a* determines that routing is required. The HMRT 1916*a* routes the message to the DCM 1820 using the IMT bus 1840. At the DCM 1820, an application layer 1940 determines what data components are passed onto an IP converter 1930. The IP converter 1930 places the SCCP level and the TCAP level in a TCP transport layer and adds an IP network layer including an IP address. The query is sent to the SCP via the IP network at Block 1908.

Still continuing with the description of FIG. 20, a reply is received from the SCP via IP at Block 1906. The IP Block 1930 strips the IP network layer and removes the TCP transport layer while adding an MTP layer so as to create an SS7 message including an SCCP level and a TCAP level. The level 3 messages are queued in a queue 1912*c* and processed by an HMDC 1910*b* and passed to HMRT 1916*b*. The message is then forwarded to the HMGC 1932 on LIM 1858*b*, stored in a queue 1912*b* and then the reply is sent at Block 1904 to the intended SP.

FIG. 21 is similar to FIG. 20 except that a TSM 2010 is added for Global Title Translation (GTT. A brief overview of GTT will now be provided.

Every SS7 MSU contains a Destination Point Code (DPC) in the routing label which signifies a specific destination node. An SSP includes a database of DPCs for which it has SS7 trunking so that each MSU can be transmitted to the proper SP. Certain features such as CLASS, E800, and LIDB require the originating SSP to address applications to which it has no direct SS7 trunking. Instead of having an extensive database of DPCs in each SSP, SS7 allows the DPC databases to be centrally located in the STPs.

In an SS7 network, the function of determining routing of an MSU based on dialed information is known as GTT. When a local exchange customer dials an 800 number, the local exchange needs certain information before a call setup exchange can take place, such as billing information and what carrier to use. An SCCP message with a TCAP is sent to the local STP for GTT. The local STP looks for a translation type value in the SCCP called party parameter of the message which will direct the MSU to the appropriate GTT table entry in the STP. The global title digits, also in the called party parameter of the message, determine the next SS7 SP to which the MSU is to be sent. The next SS7 SPs DPC from the GTT table is inserted in the routing label of the message. When the MSU arrives at the SCP, the point code in the calling party address parameter of the message will be used by the SCP to route the response directly to the SSP that originated the query.

There are two types of GTT in an SS7 network: intermediate GTT and final GTT. With intermediate GTT, the local STP performs GTT and determines the DPC of the next SS7 node to which the MSU is to be sent, but does not change the routing indicator as the MSU will be global title translated again. With final GOT, the STP determines the DPC of the SCP and the subsystem number within the SCP. The final GTT STP also performs SCP management by exchanging subsystem status MSUs with the SCP. These SCP management MSUs enable the final GTT STP to know the status of the SCP and the subsystems contained therein. The SCP is broken down into subsystems or applications that are identified by a Bellcore defined subsystem number, and after GTT has been performed the STP can route the MSU based on the availability of a node and the subsystem.

Accordingly, TSM 2010 of FIG. 21 includes an HMRT 1915*c* that determines the signaling link over which the MSU is to be sent. An SCCP Routing Control (SCRC) 2020 performs global title translation using a global title translation database 2022 and a map database 2024. An SCCP Management Function (SCMG) 2026 controls when subsystems and services become available, updates routing status of subsystems and provides tests to detect when subsystems become available or unavailable. The LNP QS 2030 performs a database lookup to determine if a called number has been ported and provides calling information if necessary. Finally, the message relay 2028 is responsible for relaying Class, CNAM and ISVM type queries to the network that received and now maintains the ported number. Each of the components of TSM 2010 are well known to those having skill in the art and need not be described further herein.

When used with GTT, a query 1902 is processed through the LIM 1858*a*. The HDMC 1910*a* determines that GTT is required. The HDMT 1910*a* therefore routes the message to the TSM 2010 rather than to the DCM 1820. The SCRC 2020 performs GTT and the message is forwarded via the DCM as was described above. The DCM sends and receives queries to and from the SCP via IP as was described above. The DCM routes the reply and the message is forwarded to HMGC 1932 on the transmitting LIM 1858*b* as was described in connection with FIG. 20.

Figure 22:
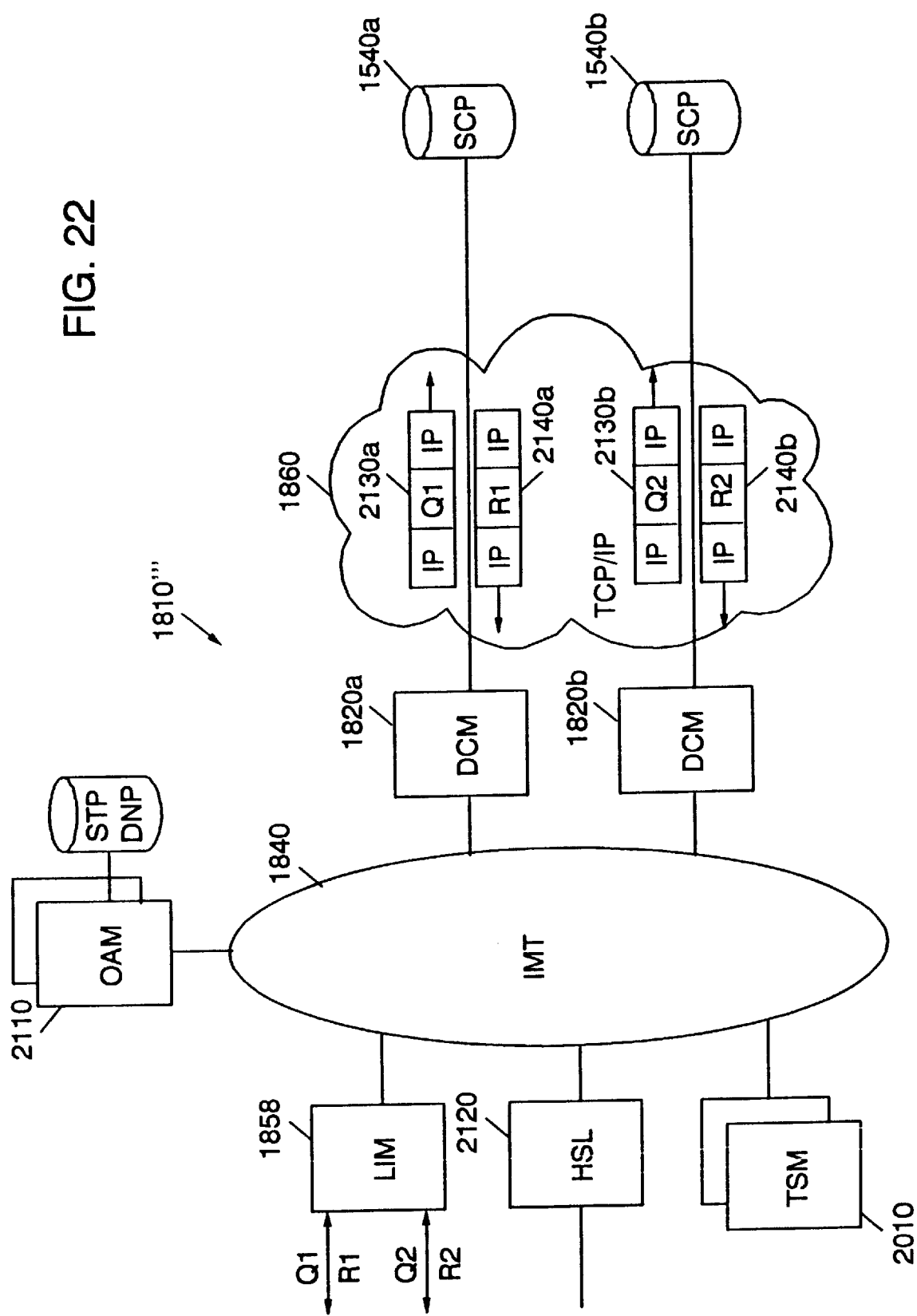
FIG. 22 is a schematic illustration of SS7 to IP message flow according to the present invention.

FIG. 22 is a schematic illustration of the SS7 -to-IP message flow. In FIG. 22, two SS7 formatted queries Q1 and Q2 are received by the STP 1810''' via a conventional SS7 LIM 1858. The LIM 1858 determines that these query messages are destined for an SCP 1540*a* or 1540*b* that are connected via an IP network 1860, and routes them internally via the IMT bus 1840 to the DCM modules 1820*a* and 1820*b*, respectively. The DCM modules 1820*a* and 1820*b* perform translation and convert the SS7 queries Q1 and Q2 to TCP/IP formatted packets 2130*a* and 2130*b*, wherein only the TCAP and SCCP layers are transmitted as was described above. The TCP/IP formatted packets 2130*a* and 2130*b* are then sent across the IP network 1860 to their respective target SCPs 1540*a* and 1540*b* respectively.

The target SCPs 1540*a* and 1540*b* receive and process the queries and broadcast responses R1 and R2 respectively. These responses are passed through the IP network 1860, by transmitting only the TCAP and SCCP levels as described above, and eventually reach the originating STP 1810''' via the respective DCM modules 1820a and 1820b. The TCP/IP formatted responses 2140a and 2140b are then translated into an SS7 format by the respective DCMs 1820a and 1820b and routed internally over the IMT bus 1840 to the appropriate LIM module 1858 and back to the SS7 network. An OAM 2110 provides operating, administration and maintenance functionality. This functionality includes user I/O, disk services, database updates to active cards and the general ability to load the resident software on the LIMs, ASMs, etc. An HSL 2120 is a high speed signaling link implemented according to the Bellcore GR-2878-core specification. This is an SS7 type link that operates on an ATM physical network as opposed to a DS0 physical network. The following table illustrates OSI standard layers and compares MTP Low Speed Links, MTP High Speed Links, Traditional IP and operation of a DCM according to the present invention.

TABLE

| OSI (Standard) | MTP Low Speed Links | MTP High Speed Links | IP (Traditional) | DCM |
| --- | --- | --- | --- | --- |
| Application | MAP | MAP | MAP | MAP |
| Presentation | TCAP | TCAP | TCAP | TCAP |
| Session | — | — | — | — |
| Transport | — | — | TCP | — |
| Network | SCCP MTP 3 | SCCP MTP 3 | IP | SCCP MTP 3 |
| Data link | MTP-2 | SAAL AAL-5 | MAC | SS7-IP Gateway TCP IP MAC |
| Physical | DS0 | T1 | 10/100 base-t | 10/100 base-t |

Although the invention has been described in detail with respect to replacing A links between an STP and an SCP by TCP/IP, other SS7 links may also be replaced by TCP/IP links. For example, implementation of ISUP (call setup/call teardown) functionality via intermediate IP network transport of ISUP data may be performed. SS7 formatted ISUP data can be translated into TCP/IP format and sent to a first STP, routed through an associated IP network and received and re-translated back into SS7 format by a second STP. Thus, the B links between STPs may also be replaced by TCP/IP links. Other links may also be replaced.

Different scanning strategies between SS7 links and TCP/IP can be preprogrammed and/or user selected via a menu driven display. Alternatively, different scanning strategies can be periodically tried. The strategy which on average finds a channel most quickly in different signal environments can be selected as the preferred strategy when that signal environment is encountered.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A Signaling Point (SP) for a Signaling System 7 (SS7) network, the SP comprising:
   (a) a Signal Transfer Point (STP) that transfers SS7 call signaling messages between other SPs of the SS7 network; and
   (b) an SS7/Internet Protocol (IP) gateway that is connected to the STP to bidirectionally communicate at least some of the transferred SS7 call signaling messages between the STP and at least one of the other SPs of the SS7 network using Internet Protocol (IP), wherein the SS7/IP gateway comprises:
   (b)(i) an interprocessor message transport (IMT) bus;
   (b)(ii) a plurality of link interface modules (LIMs) that are connected to the IMT bus, each of the LIMs being connected to at least one of the other SPs of the SS7 network, the LIMs communicating with one another via the IMT bus to transfer the SS7 call signaling messages among the at least one of the other SPs of the SS7 network; and
   (b)(iii) a data communications module (DCM) that is connected to the IMT bus and to an IP network, to map the SS7 call signaling messages between SS7 and IP and thereby bidirectionally transfer the SS7 call signaling messages between the STP and the at least one of the other SPs of the SS7 network using IP, wherein the DCM is not connected to the LIMs via an external SS7 signaling link.

2. The SP according to claim 1 wherein the DCM comprises:
   (a) means for receiving from the IMT bus, a first SS7 call signaling message including an SS7 Message Transfer Part (MTP) level, an SS7 Signaling Connection Control Part (SCCP) level and an SS7 Transaction capabilities Application Part (TCAP) level;
   (b) means for stripping the MTP level from the first SS7 call signaling message;
   (c) means for adding an IP network layer to the SCCP level and the TCAP level that remain in the first SS7 call signaling message to create a first IP message, the IP network layer including an IP address;
   (d) means for transmitting the first IP message to the IP address over the IP network;
   (e) means for receiving a second IP message from the IP network, the second IP message including an SS7 SCCP level, an SS7 TCAP level and an IP network layer;
   (f) means for stripping the IP network layer from the second IP message to create a second SS7 call signaling message including an SS7 SCCP level and an SS7 TCAP level; and
   (g) means for transferring the second SS7 call signaling message to the IMT bus.

3. The SP according to claim 1 wherein the DCM comprises:
   (a) means for receiving from the IMT bus, a first SS7 call signaling message including an SS7 Message Transfer Part (MTP) level, an SS7 Signaling Connection Control Part (SCCP) level and an SS7 Transaction Capability Application Part (TCAP) level;
   (b) means for stripping the MTP level from the first SS7 call signaling message;
   (c) means for placing the SCCP level and the TCAP level that remain in the first SS7 call signaling message in a Transmission Control Protocol (TCP) transport layer to create a first TCP message;
   (d) means for adding an IP network layer to the first TCP message to create a first TCP/IP message, the IP network layer including an IP address;
   (e) means for transmitting the first TCP/IP message to the IP address over the IP network using TCP transport;
   (f) means for receiving a second TCP/IP message from the IP network, the second TCP/IP message including an SS7 SCCP level and an SS7 TCAP level in a TCP transport layer and an IP network layer;

(g) means for stripping the IP network layer from the second IP message to create a second TCP transport message including the SS7 SCCP level and the SS7 TCAP level;

(h) means from removing the TCP transport layer from the second TCP message to create a second SS7 call signaling message including an SS7 SCCP level and an SS7 TCAP level; and (i) means for transferring the second SS7 call signaling message to the IMT bus.

4. The SP according to claim 1 wherein the DCM comprises:

(a) an IP converter that is responsive to the IMT bus, to map an SS7 call signaling message into IP, and that is responsive to the IP network to map an IP message into SS7;

(b) a Message Handling Discrimination (HMDC) function that is responsive to the IP converter to determine whether an SS7 call signaling message that is received from the IP converter is destined for the SP or for one of the other SPs of the SS7 network; and (c) a Message Handling Routing (HMRT) function that is responsive to the HMDC function, to route an SS7 call signaling message that is received from the IP converter to one of the other SPs of the SS7 network via the IMT bus.

5. An SP according to claim 1 wherein the SS7/IP gateway is connected to the STP to bidirectionally communicate at least some of the transferred SS7 call signaling messages between the STP and at least one Service Control Point (SCP) using IP.

6. The SP according to claim 1 wherein the SS7/IP gateway is connected to the STP to bidirectionally communicate at least some of the transferred SS7 call signaling messages between the STP and at least one Service Switching Point (SSP) using IP.

7. The SP according to claim 1 wherein the SS7/IP gateway is connected to the STP to bidirectionally communicate at least some of the transferred SS7 call signaling messages between the STP and at least a second STP using IP.

8. The SP according to claim 1 wherein the SS7/IP gateway is connected to the STP to bidirectionally communicate at least some of the transferred SS7 call signaling messages between the STP and a second mated STP using IP.

9. The SP according to claim 1 wherein the SS7/IP gateway is connected to the STP to bidirectionally communicate at least some of the transferred SS7 call signaling messages between the STP and other components of the SS7 network using Transmission Control Protocol/Internet Protocol (TCP/IP).

10. A Signal Transfer Point (STP) comprising a special-purpose SS7 signaling point for routing SS7 messages between other SS7 signaling points of the SS7 network, the STP comprising:

(a) means for bidirectionally transferring SS7 call signaling messages among Signaling Points (SP) of the SS7 network and Internet Protocol (IP) nodes of an IP network, wherein the means for bidirectionally transferring SS7 call signaling messages among SPs of the SS7 network and IP nodes of the IP network comprises:

(a)(i) an interprocessor message transport (IMT) bus; and (a)(ii) a plurality of link interface modules (LIMs) that are connected to the IMT bus, each of the LIMs being connectable to at least one of the other SPs of the SS7 network, the LIMs communicating with one another via the IMT bus to transfer the SS7 call signaling messages among the at least one of the other SPs of the SS7network; and (a)(ii) means for bidirectionally transferring messages among IP nodes of the IP network, wherein the means for bidirectionally transferring messages among IP nodes of the IP network includes a data communications module adapted to receive an IP-encapsulated SS7 call signaling message from a first IP node of the IP network and to route the IP-encapsulated SS7 call signaling message to a second IP node of the IP network, wherein the means for bidirectionally transferring SS7 call signaling messages is not coupled to the means for bidirectionally transferring messages among IP nodes via an external SS7 signaling link.

11. The STP according to claim 10 wherein the means for bidirectionally transferring SS7 call signaling messages among SPs of the SS7 network and IP nodes of the IP network comprises means for bidirectionally transferring SS7 call signaling messages between the STP and at least one Service Control Point (SCP) of the SS7 network.

12. The STP according to claim 10:

(a) wherein the means for bidirectionally transferring SS7 call signaling messages between SPs of the SS7 network and IP nodes of an IP network comprises means for bidirectionally transferring SS7 call signaling messages among SPs of the SS7 network using Transmission Control Protocol/Internet Protocol (TCP/IP); and (b) wherein the means for bidirectionally transferring messages among IP nodes of the IP network comprises means for bidirectionally transferring messages among IP nodes of the IP network using TCP/IP.

13. A Sign Transfer Point (STP) STP comprising a special-purpose SS7 signaling point for routing SS7 messages between other SS7 signaling points of the SS7 network, the STP including Signaling System Seven (SS7) and Internet Protocol (IP) communication capabilities, the STP comprising:

(a) an SS7 link interface module for receiving the first SS7 call signaling messages from first SS7 signaling points (SPs) in an SS7 network and for transmitting second SS7 call signaling messages to the first SS7 SPs via the SS7 network;

(b) a data communication module to receiving first IP-encapsulated SS7 call signaling messages from an IP network, formulating the second SS7 call signaling messages based on the first IP-encapsulated SS7 call signaling messages to the SS7 link interface module to be transmitted to the first SS7 SPs over the SS7 network, wherein the SS7 link interface module is not connected to the data communication module via an external SS7 signaling link; and (c) an interprocessor message transfer (IMT) bus for connecting the SS7 link interface module and the data communications module within the STP.

14. The Signal Transfer Point of claim 13 wherein the first interface module is adapted to forward at least some of the first SS7 call signaling messages to the second interface module to be transmitted to second SS7 SPs over the IP network.

15. The Signal Transfer Point of claim 14 wherein the second interface module is adapted to formulate second IP-encapsulated SS7 call signaling messages based on the first SS7 call signaling messages received from the first interface module and to forward the second IP-encapsulated SS7 messages to the second SS7 SPs via the IP network.

16. The Signal Transfer Point of claim 15 wherein the second interface module is adapted to strip at least some SS7 level 1 and 2 information from the first SS7 call signaling messages received from the first interface module in formulating the second IP-encapsulated SS7 call signaling messages.

17. The Signal Transfer Point of claim 15 wherein the second interface module is adapted to retain SS7 level 1 and 2 information in the first SS7 call signaling messages received from the first interface module in formulating the second IP-encapsulated SS7 call signaling messages.

18. The Signal Transfer Point of claim 15 wherein the link interface module includes:

(a) a message handling a discrimination process for determining whether the first SS7 call signaling messages are intended for the STP or for other nodes in the SS7 network; and (b) a message handling and distribution process for receiving the first SS7 call signaling messages from the message handling and discrimination process that are intended for the STP and forwarding the messages to a processing module within the STP for further processing.

19. The Signal Transfer Point of claim 18 wherein the message handling and distribution process is adapted to forward at least some of the first SS7 call signaling messages received from the message handling and discrimination process to the data communications module for IP processing.

20. The Signal Transfer Point of claim 13 wherein the data communications module includes an IP converter for receiving the first IP-encapsulated SS7 call signaling messages and formulating the second SS7 call signaling messages based on the first IP-encapsulated SS7 call signaling messages.

21. The Signal Transfer Point of claim 20 wherein the IP converter is adapted to remove IP header information from the first IP-encapsulated SS7 call signaling messages in formulating the second SS7 call signaling messages.

22. The Signal Transfer Point of claim 20 wherein the IP converter is adapted to remove Transmission Control Protocol (TCD) header information from the first IP-encapsulated SS7 messages in formulating the second SS7 call signaling messages.

23. The Signal Transfer Point of claim 20 wherein the IP converter is adapted to formulate second IP-encapsulated SS7 call signaling messages based on the first SS7 call signaling messages received from the link interface module and to forward the second IP-encapsulated SS7 call signaling messages to the second SS7 SPs via the IP network.

24. The Signal Transfer Point of claim 20 wherein the IP converter is adapted to strip at least some SS7 level 1 and 2 information from the first SS7 call signaling messages received from the link interface module in formulating the second IP-encapsulated SS7 messages.

25. The Signal Transfer Point of claim 20 wherein the IP converter is adapted to retain SS7 level 1 and 2 information in the first SS7 call signaling messages received from the link interface module in formulating the second IP-encapsulated SS7 call signaling messages.

26. The Signal Transfer Point of claim 13 wherein the first IP-encapsulated SS7 call signaling messages comprise IP-encapsulated Transaction Capabilities Application Part (TCAP) messages.

27. The Signal Transfer Point of claim 13 wherein the first SS7 call signaling messages comprise Transaction Capabilities Application Part (TCAP) messages and the second interface module is adapted to formulate second IP-encapsulated SS7 call signaling messages based on the TCAP messages.

28. The Signal Transfer Point of claim 27 wherein the second interface module is adapted to strip SS7 level 1 and 2 information from the TCAP messages in formulating the second IP-encapsulated SS7 call signaling messages.

29. The Signal Transfer Point of claim 27 wherein the data communications module is adapted to retain SS7 level 1 and 2 information in the TCAP messages in formulating the second IP-encapsulated SS7 call signaling messages.

30. The Signal Transfer Point of claim 13 comprising a processing module for receiving at least some of the second SS7 call signaling messages from the data communications module, performing global title translation on the second SS7 call signaling messages, and forwarding the global-title-translated messages to the link interface module to be transmitted to the first SS7 SPs over the SS7 network.

31. The Signal Transfer Point of claim 13 wherein the data communications module is adapted to formulate IP messages based on the first IP-encapsulated SS7 call signaling messages, and to forward the IP messages to IP nodes over the IP network.

32. The Signal Transfer point of claim 31 wherein the IP messages comprise IP-encapsulated SS7 call signaling messages.

* * * * *

UNITED STATES PATENT AND TRADEMARK OFFICE
CERTIFICATE OF CORRECTION

PATENT NO.    : 6,324,183 B1
DATED         : November 27, 2001
INVENTOR(S)   : Miller et al.

It is certified that error appears in the above-identified patent and that said Letters Patent is hereby corrected as shown below:

Column 16,
Line 36, replace "Sign" with -- Signal --.
Line 47, replace "to" with -- for --.

Column 17,
Line 44, replace "(TCD)" with -- (TCP) --.

Signed and Sealed this

Twenty-sixth Day of March, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,324,183 B1
DATED         : November 27, 2001
INVENTOR(S)   : Paul Andrew Miller et al.

It is certified that error appears in the above-identified patent and that said Letters Patent is hereby corrected as shown below:

<u>Column 16,</u>
Line 52, after "messages" insert -- , and forwarding the second SS7 call signaling messges --.

Signed and Sealed this

Twenty-sixth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,324,183 B1
DATED          : November 27, 2001
INVENTOR(S)    : Paul Andrew Miller et al.

It is certified that error appears in the above-identified patent and that said Letters Patent is hereby corrected as shown below:

Column 17,
Line 17, replace "a message handling a discrimination process" with -- a message handling and discrimination process --.

Signed and Sealed this

Second Day of November, 2004

JON W. DUDAS
*Director of the United States Patent and Trademark Office*